United States Patent
Millar et al.

(10) Patent No.: US 12,425,106 B2
(45) Date of Patent: Sep. 23, 2025

(54) MULTI-LENGTH LOOK-UP TABLE SPHERICAL CONSTELLATION SHAPING

(71) Applicant: Infinera Corporation, San Jose, MD (US)

(72) Inventors: David S. Millar, San Jose, CA (US); Mehdi Torbatian, Ottawa (CA); Han Henry Sun, San Jose, CA (US)

(73) Assignee: Infinera Corporation

( * ) Notice: Subject to any disclaimer, the term of this patent is extended or adjusted under 35 U.S.C. 154(b) by 278 days.

(21) Appl. No.: 18/221,798

(22) Filed: Jul. 13, 2023

(65) Prior Publication Data

US 2024/0022334 A1 Jan. 18, 2024

Related U.S. Application Data

(60) Provisional application No. 63/471,860, filed on Jun. 8, 2023, provisional application No. 63/388,998, filed on Jul. 13, 2022.

(51) Int. Cl.
*H04B 10/54* (2013.01)
*H04B 10/50* (2013.01)

(52) U.S. Cl.
CPC .......... *H04B 10/54* (2013.01); *H04B 10/503* (2013.01)

(58) Field of Classification Search
None
See application file for complete search history.

(56) References Cited

U.S. PATENT DOCUMENTS

2015/0171895 A1* 6/2015 Pfau .................. G06F 11/10
714/776
2019/0149389 A1* 5/2019 Torbatian ............ H04B 10/541
375/298

* cited by examiner

*Primary Examiner* — David W Lambert

(57) ABSTRACT

Consistent with the present disclosure, an encoder circuit is provided at a transmit side of an optical fiber link that maps an input sequence of bits of fixed length k to a sequence of symbols of a codeword of length n, such that the symbols of the codeword define a predetermined transmission probability distribution. In one example, each subgroup of bits of the k input bit sequence is provided to a respective look-up table, whereby the sub-group of bits constitutes an address of a particular memory location in the corresponding look-up table. Based on the address, the contents at the particular memory location addressed by each subgroup of bits are output as a corresponding portion of a codeword. Each such codeword portion is provided to a further memory or buffer, such that the entire codeword is assembled in the buffer and output to forward error correction (FEC) circuitry. In a further example, the contents of each memory location of each look-up table is determined based on a sphere constellation shaping.

20 Claims, 25 Drawing Sheets

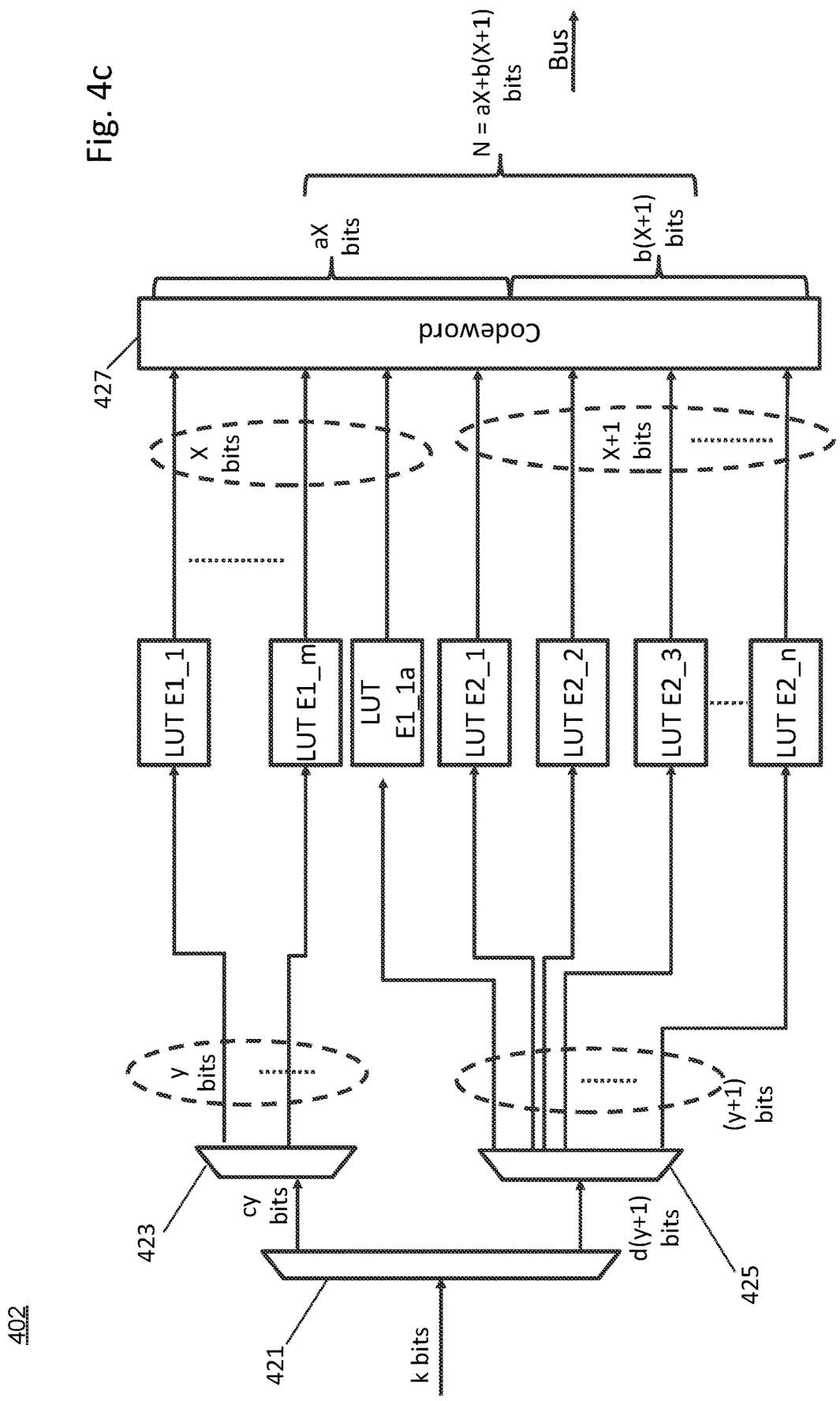

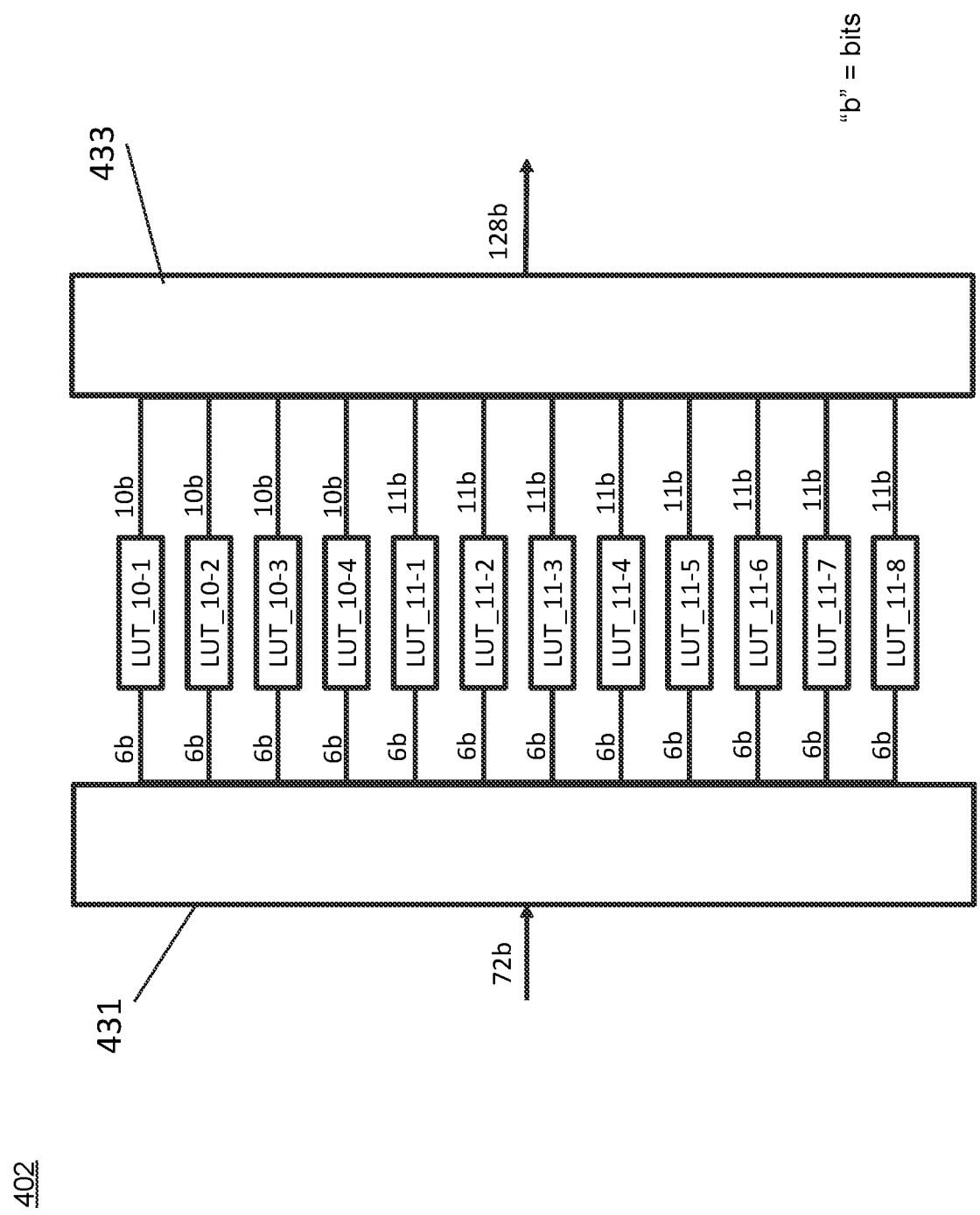

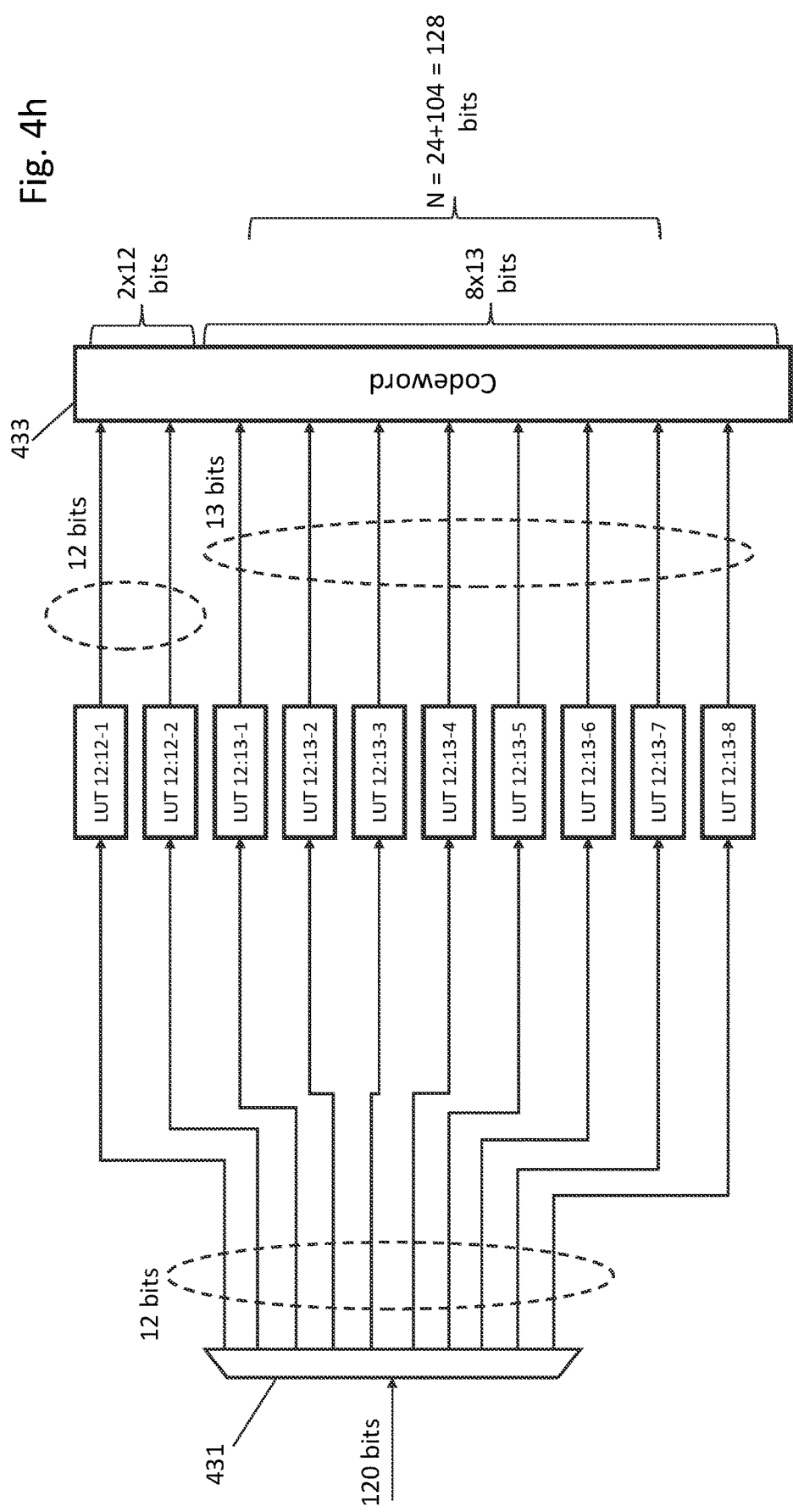

Fig. 10

| Input Bit sequence | 000 | 001 | 010 | 011 | 100 | 101 | 110 | 111 |
|---|---|---|---|---|---|---|---|---|
| Codewords | 00111 | 01011 | 01101 | 01110 | 10101 | 10110 | 11001 | 11010 |

1000

MULTI-LENGTH LOOK-UP TABLE SPHERICAL CONSTELLATION SHAPING

This application claims priority under 35 U.S.C. § 119 to U.S. Provisional Patent Application No. 63/388,998, filed on Jul. 13, 2022, and U.S. Provisional Patent Application No. 63/471,860, filed on Jun. 8, 2023, the entire content of each of which is incorporated by reference herein in its entirety.

Optical communication systems are known in which data is carried over amplitude/phase modulated optical signals that are transmitted along an optical fiber link to a receiver node. Such optical signals may be transmitted in accordance with a variety of standard modulation formats using polarization multiplexing (also known as dual polarization), such as binary phase shift keying (BPSK), 3-quadrature amplitude modulation (3-QAM), quadrature phase shift keying (QPSK, or 4-QAM), 8-QAM, 16-QAM, 32-QAM, and 64-QAM, with fixed spectral efficiency (SE) of 2, 3, 4, 6, 8, 10, and 12 b/dual-pol-symbol, respectively. These modulation formats are uniformly distributed, such that transmission of each symbol, each of which having a corresponding constellation point, is equally probable. Put another way, the probability of any signal point of the constellation or constellation point is the same as the probability of occurrence of any other signal point of the constellation.

For communication systems in which symbols are transmitted in accordance with uniform discrete signal constellations, the required signal power to noise power ratio (SNR) for error free communication is normally away from the Shannon limit regardless of the strength of the employed forward error correction (FEC). This gain loss, which increases at higher spectral efficiency, reaches to up to 1.53 dB for a n-dimensional (n-D) cube constellations, which are square constellations expanded over n complex dimensions, as n goes to infinity.

Optical signals or channels may be transmitted along optical fiber that constitute at least part of an optical communication path. The noise associated with such path has been determined in many instances to be Gaussian in nature, and such noise has been termed additive white Gaussian noise (AWGN) in a linear power limited regime. Optimal capacity for optical signals propagating in an AWGN channel has been achieved with Gaussian probability distributions in which transmission probability of symbols (and their corresponding constellation points) correspond to a Gaussian distribution. Such Gaussian probability distributions are not uniform and are therefore different from the uniform distribution that normally exists on the standard modulation formats noted above.

For a given optical fiber path distance and at a desired SNR margin from the forward error correction (FEC) threshold, there is an optimal SE for which the transmission rate is maximized. Typically, however, such optimal SE cannot be achieved with the standard modulation formats noted above, because the fixed SEs with coarse granularities associated with such modulation formats may either be too high or too low for the link. Thus, the deployed transmission data rate on the link is normally less than what the link ideally can carry.

An alternative approach to minimize the gain loss due to non-ideal input distribution is referred to as "constellation shaping." In constellation shaping, the signal space is encoded such that the distribution of the projection of the n-D constellation on each of the real and the imaginary dimensions of the constellation follows a desired probability distribution, which may be Gaussian. In probabilistic constellation shaping, the input information data bits are encoded such that when they are mapped to a specific 2-D constellation, the probability of occurrence of each of the constellation points follows a desired probability distribution. In other words, unlike standard modulation formats, in which symbols associated with each constellation point are transmitted with equal probability, in probabilistic shaping, certain symbols associated with particular constellation points are transmitted more frequently, i.e., have a higher likelihood or probability of transmission, compared to other symbols corresponding to other constellation points. It has been shown that probabilistic constellation shaping may be able to recover the shaping gain that is lost when standard uniform modulation formats are deployed.

A given spectral efficiency (SE) may be associated with a specific probability distribution for a corresponding constellation. Thus, different SEs may be obtained by changing the probability distribution. This is equivalent to designing a single circuit to accommodate many different modulation formats to approximate the Shannon capacity limit for a given link. Thus, in addition to improved SNR gain, probabilistic constellation shaping provides a mechanism to finely tune the SE to maximize the transmission data rate over a communication link at a fixed desired SNR margin.

Conventional constellation (or probabilistic) shaping techniques, however, often require complex circuitry and may require excessive power. Moreover, since the outputs (or "codewords") of conventional constellation shaping circuitry are typically fed to forward error correction (FEC) circuitry, the length of a codeword should match the length of an input bit sequence or the length of a bus to the FEC circuitry. Accordingly, a given constellation shaping circuit may output codewords that are compatible with specific FEC circuitry, but not other FEC circuitry requiring an input with a different bit sequence length. As a result, a substantial redesign of the constellation shaping circuitry may be required for each FEC circuit. Alternatively, additional circuits, such as a gearbox, may be required to adapt or modify the codeword for input to the FEC circuit. Such circuits may require additional power and add complexity.

SUMMARY

Consistent with the present disclosure, an apparatus is provided that comprises an encoder circuit that receives an input data sequence, the input data sequence including k bits, where k is an integer. The encoder circuit outputs a codeword, based on the input data sequence, whereby the codeword includes n codeword symbols, where n is an integer. The encoder circuit includes a plurality of memories, a first one of the plurality of memories having a first memory address and a second one of the plurality of memories having a second memory addresses. A number of the first memory addresses is different than a number of the second memory addresses, such that based on a respective subset of the k bits, each of the plurality of memories supplies a respective portion of the codeword.

The apparatus further includes a laser and a modulator that receives light from the laser. A drive circuit is also provided that supplies a drive signal, based on the codeword, to the modulator. The modulator, in turn, supplies a modulated optical signal in accordance with a quadrature amplitude modulation (QAM) format, such that, based on the drive signal, the modulated optical signal carries modulation symbols in accordance with the codeword. The codeword being is indicative of a distribution of the modulation symbols, wherein first ones of the modulation symbols having an associated first amplitude are transmitted more frequently than second ones of the modulation symbols having an associated second amplitude that is different than the first amplitude.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 4c-4j illustrate examples of the encoder circuit shows in FIGS. 4a and 4b;

FIG. 10 illustrates a table that lists examples of input bit sequences and corresponding codewords consistent with a further aspect of the present disclosure;

DESCRIPTION OF THE EMBODIMENTS

Consistent with the present disclosure, an encoder circuit is provided at a transmit side of an optical fiber link that maps an input sequence of bits of fixed length k to a sequence of symbols of a codeword of length n, such that the symbols of the codeword define a predetermined transmission probability distribution. In one example, each subgroup of bits of the k input bit sequence is provided to a respective look-up table, whereby the sub-group of bits constitutes an address of a particular memory location in the corresponding look-up table. Based on the address, the contents at the particular memory location addressed by each subgroup of bits are output as a corresponding portion of a codeword. Each such codeword portion is provided to a further memory or buffer, such that the entire codeword is assembled in the buffer and output to forward error correction (FEC) circuitry. In a further example, the contents of each memory location of each look-up table is determined based on a sphere constellation shaping.

Accordingly, the addressing and contents of the look-up tables may be predetermined to provide codewords that are compatible with an associated FEC bus, as opposed to providing reconfigured hardware, for example, of the constellation shaping encoder. Thus, any desired codeword length can be obtained without a substantial redesign of the constellation shaping encoder circuit. Moreover, the constellation shaping encoder is based on an arrangement of look-up tables or memories, as opposed to processors or other encoder circuitry, which may be more complex than a relatively simple assembly of look-up tables.

Figure 1:
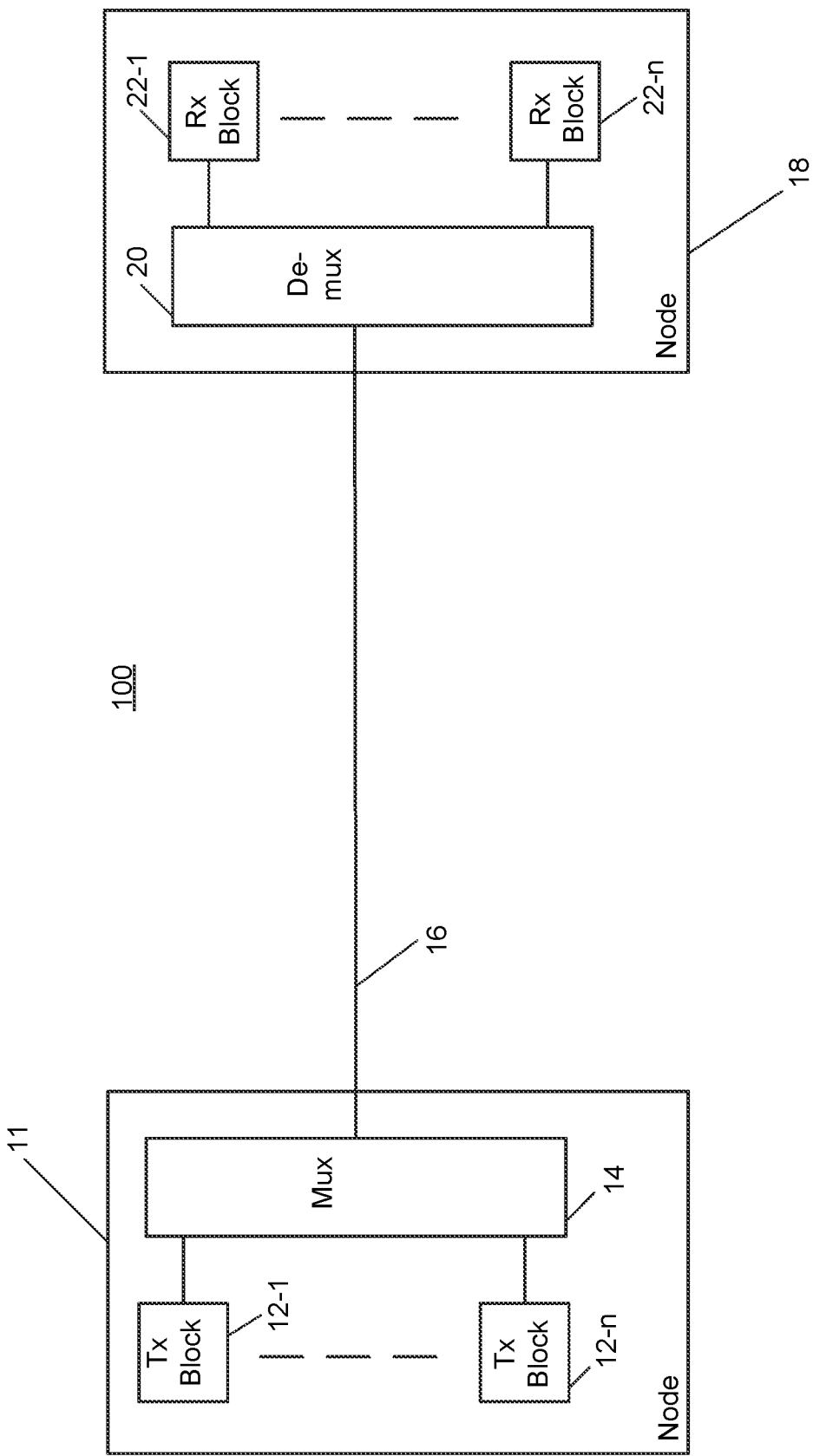
FIG. 1 illustrates a block diagram of an optical communication system consistent with an aspect of the present disclosure.

Section 1— Description of an Optical Communication System Incorporating and Encoder and Decoder Consistent with the Present Disclosure FIG. 1 illustrates an optical link of optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams or input sequences Data-1 to Data-n. Multiplexer 14, which may include one or more optical filters, for example, combines each of group of optical signals onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2:
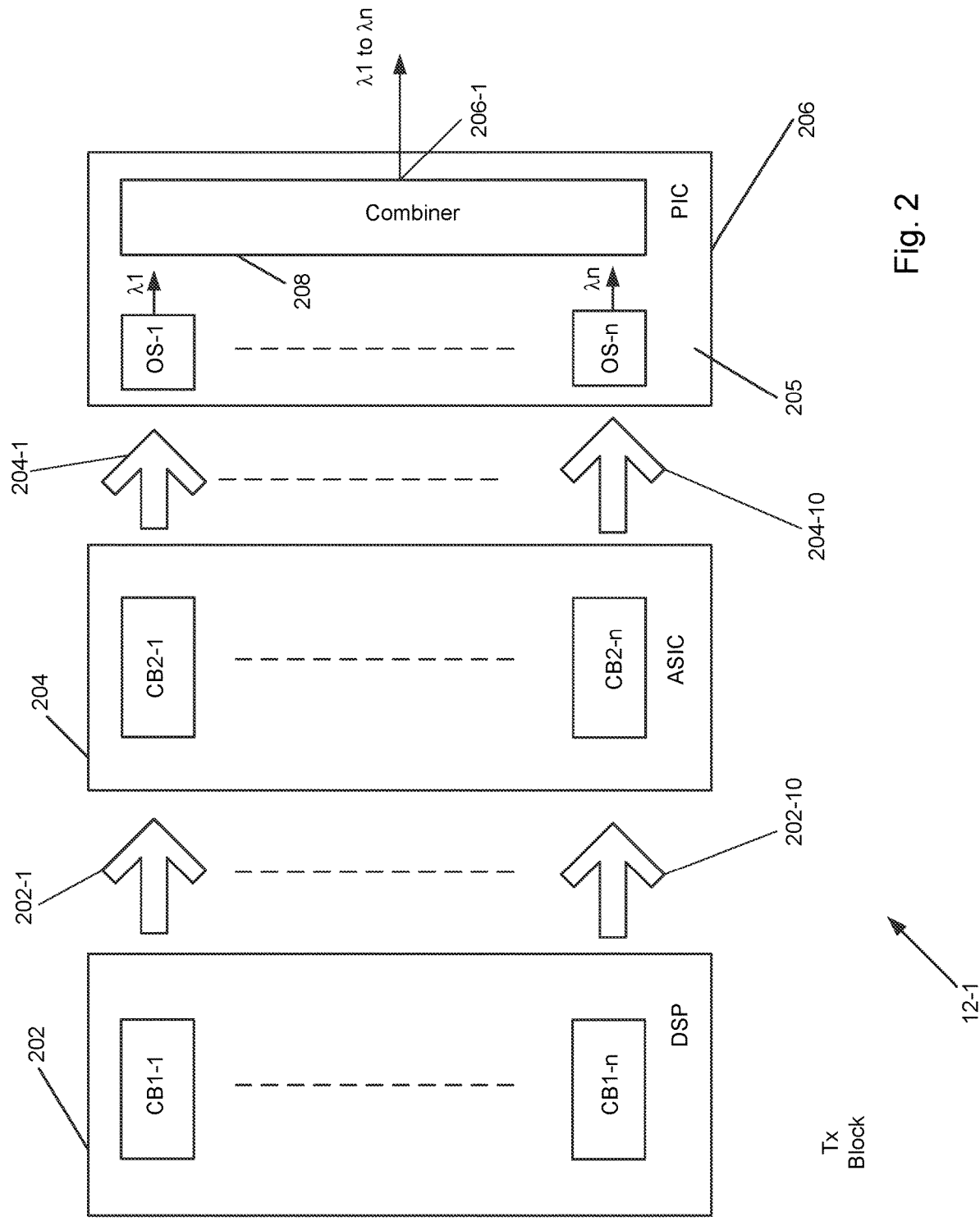
FIG. 2 illustrates a diagram of a transmit block, including a transmission circuit, consistent with an additional aspect of the present disclosure.

FIG. 2 illustrates one of transmitter blocks 12-1 in greater detail.

Transmitter block 12-1 may include a digital signal processor (DSP) 202 including circuitry or circuit blocks CB1-1 to CB1-n, each of which receiving, for example, a corresponding portion of Data-1 and supplying a corresponding one of outputs or electrical signals 202-1 to 202-n to a circuit, such as application specific integrated circuit (ASIC) 204. ASIC 204 include circuit blocks CB2-1 to CB2-n, which supply corresponding outputs or electrical signals 204-1 to 204-$n$ to optical sources or transmitters OS-1 to OS-2 provided on transmit photonic integrated circuit (PIC) 205. As further shown in FIG. 2, each of optical sources OS-1 to OS-2 supplies a corresponding one of modulated optical signals having wavelengths λ1 to λ10, respectively. The optical signals are combined by an optical combiner or multiplexer, such as arrayed waveguide grating (AWG) or power combiner 208, for example, and combined into a band or group of optical signals supplied by output 206-1. Optical sources OS-1 to OS-n and multiplexer 208 may be provided on substrate 205, for example. Substrate 205 may include indium phosphide or other semiconductor materials. It is understood, that optical sources OS-1 to OS-n, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices. In addition, components and/or devices in each of circuit blocks CB1, CB2, and optical sources OS and combiner 208 may be integrated with one or more of such components and/or devices or may be provided as discrete devices or components.

DSP and ASIC 202 may collectively constitute a transmission circuit that supplies drive signals (electrical signals) to the modulators in optical source OS-1 as well as the remaining optical sources.

Figure 3:
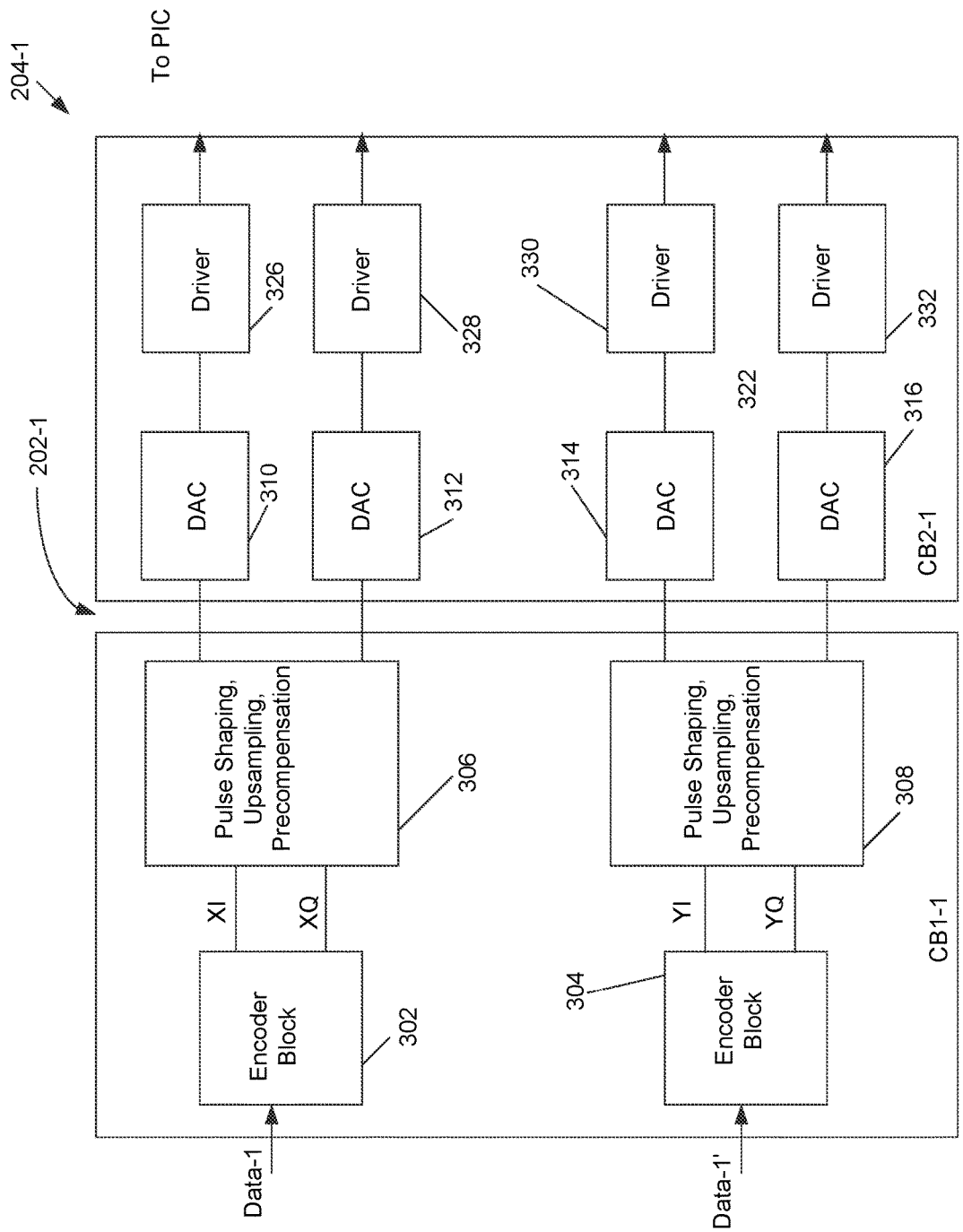
FIG. 3 illustrates features of a digital signal processor and application specific integrated circuit consistent with an aspect of the present disclosure.

FIG. 3 illustrates a portion of transmission circuit 1, namely, circuit block CB1-1 of DSP 202 in greater detail. Circuit block CB-1 includes an encoder block 302 that supplies in-phase (XI) and quadrature (XQ) symbols for modulating the X (or transverse electric—TE) polarization of the transmitted optical signal.

Figure 4A:
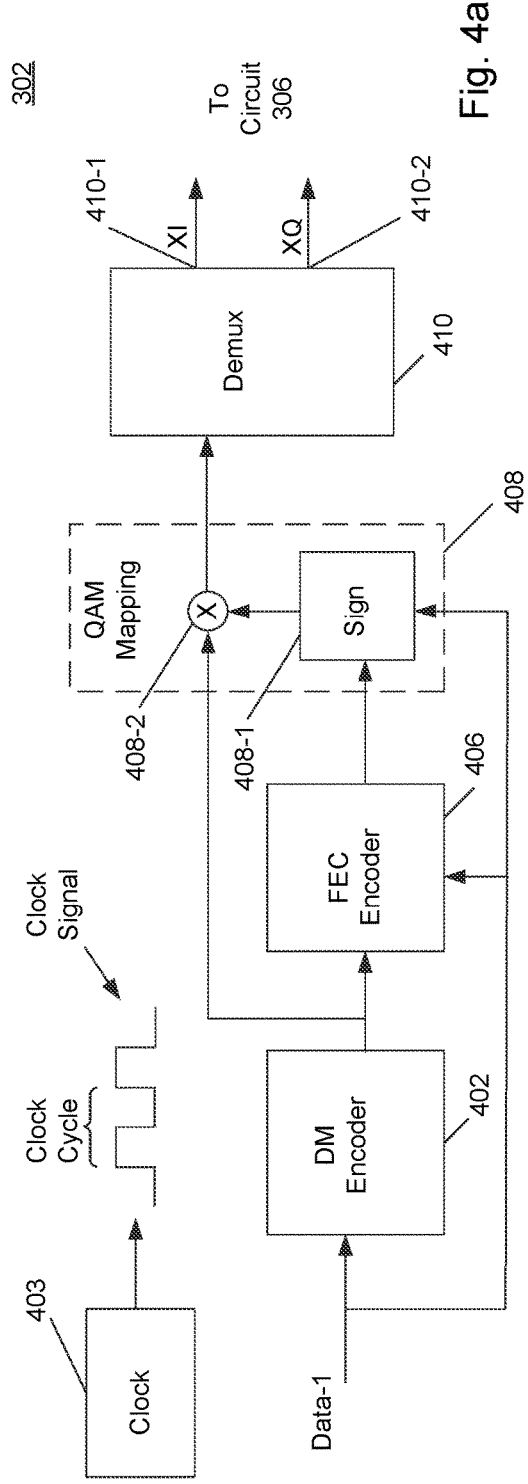
FIGS. 4a and 4b illustrate features of an encoder circuit consistent with a further aspect of the present disclosure.

Encoder block 302 is shown in greater detail in FIG. 4a. As shown in FIG. 4a, Encoder block 302 include distribution matching (DM) encoder 402 that may receive input bit sequences Data-1, each having a length of k-bits, and supply codewords, each having n symbols to FEC encoder 406 and multiplier 408-2 of QAM mapping circuit 408 (see below). Each symbol of the codeword corresponds to an amplitude of a constellation point of a transmitted symbol on the real or imaginary axes (I or Q signal components). As discussed in greater detail below, DM encoder 402 outputs, for example, a codeword, in a further example, each clock cycle of the clock signal output from clock circuit 403, such that a codeword is output from DM encoder 402 each clock cycle based on the contents of look-up tables (LUTs) in the encoder 402. Encoder circuit 402 also assigns each symbol of the codeword a unique binary label suitable for Gray coding the label may also be non-binary. The binary or non-binary labels are next supplied to a forward error correction encoder circuit 406, which provides encoded symbols based on the received labels and the input data sequence. The encoded symbols are next fed to a quadrature amplitude modulation (QAM) mapper circuit 408, which includes a sign circuit 408-1 and a multiplier 408-2. Sign circuit 408-1 determines a sign of the I and Q symbols for identifying a particular quadrant of the constellation in which a point associated with a particular transmitted symbol is located. Such location is determined based on the received encoded symbols and input sequence. The sign information output from sign circuit 408-1 is provided to multiplier 408-2, which multiplies each symbol of each codeword by the sign information to generate, in one example, a stream of alternating in-phase and quadrature symbols. Demultiplexer 410 receives the stream of in-phase and quadrature symbols and supplies the in-phase symbols (XI) at a first output 410-1 and the quadrature symbols (XQ) at a second output 410-2.

It is noted that encoder block 304 shown in FIG. 3 has the same or similar structure as encoder 302 but provides in-phase (YI) and quadrature (YQ) symbols for modulating the Y (or transverse magnetic—TM) component of the transmitted optical signal.

Figure 4B:
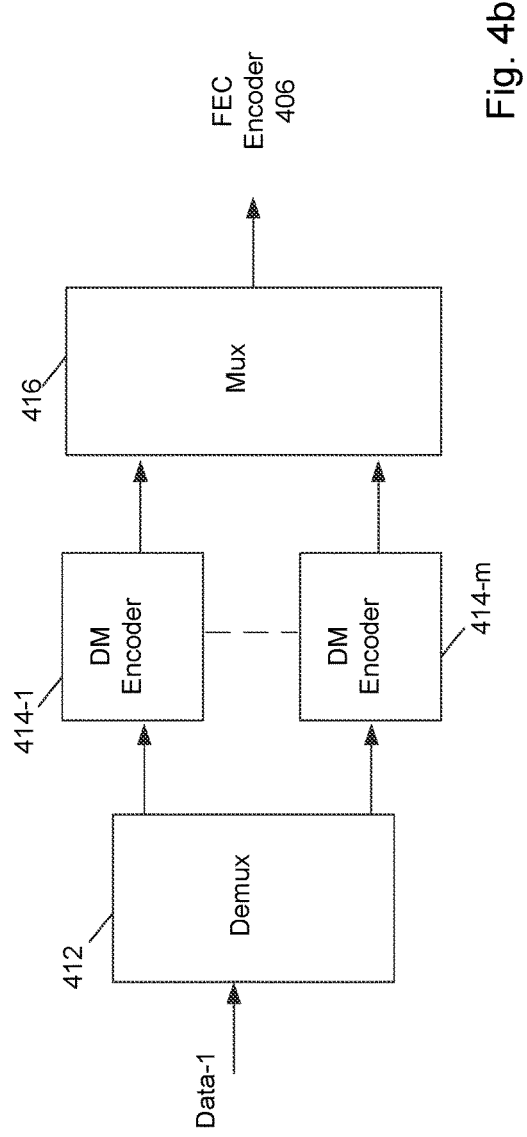

FIG. 4b shows an alternative implementation of a DM encoder having a parallel structure. Here the input sequence is supplied to a demultiplexer 412 which supplies input data segments to each of DM encoder 414-1 to 414-$m$ having the same or similar structure as DM encoder 402. Each of DM encoder 414-1 to 414-$m$ may output a separate codeword, for example, to a corresponding one of labelling circuits 415-1 to 415-$m$, which in turn, supply labels to multiplexer 416. Multiplexer 416 may multiplex the labels associated with each codeword, which may be subject to the processing noted above with respect to FIG. 4a to generate symbols XI, XQ, YI, and YQ.

Examples of encoder circuit 402 including look-up tables consistent with an aspect of the present disclosure will next be described with reference to FIGS. 4c-4j.

As shown in FIG. 4c, encoder circuit 402 receives an input data sequence of k bits corresponding to Data-1 discussed above. In one example, the input data sequence is input to a demultiplexer 421 that outputs cy bits to a second demultiplexer 423 and d(y+1) bits to a third demultiplexer 425. Second demultiplexer 423 supplies subsets or subgroups of the input data sequence, each including y bits is supplied to a respective one of memories or look-up tables LUT E1_1 to LUT E1_$m$. In addition, third demultiplexer 425 supplies additional subsets of the input data sequence, each including y+1 bits to a respective one of memories or look-up tables LUT E1_1$a$ and LUT E2_1 to LUT E2_$n$. Each of the look-up tables LUT has a plurality of memory locations, which, in one example, are addressed by a respective one of the subsets of the input data. Accordingly, each subgroup designates, in a further example, a particular location in a corresponding look-up table, and the contents or bits stored at that location are output to a buffer or a further memory 427. For example, in FIG. 4c, each of look-up tables LUT E1_1 to LUT E1_$m$ and look-up table LUT E1_$a$ supply a respective portion of the codeword, each such portion including x bits, to memory 427. In addition, each of look-up tables LUT E2_1 to LUT E2_$n$ outputs a respective portion of the codeword, each such portion including x+1 bits, to memory 427. As a result, the portions of the codeword are assembled and output collectively as the codeword of length N, where N=aX+b(x+1) bits. As noted above, the contents of the look-up tables LT are based on a sphere constellation shaping formula or algorithm.

A further description of the encoder architecture shown in FIG. 4c will next be described. For a bus (and codeword) width N input to FEC encoder 406 and look-up table size x, integers a and b can be determined, such that N=aX+b(x+1). This bus width constraint is met with "a" look-up tables of size X and "b" look-up tables of size x+1. Likewise, for total information bits k (see Data-1 above), the average number of input bits per look-up table is k_av=k/(a+b). Accordingly, the total information length constraint can be satisfied by finding integers c and d, such that k=cy+d(y+1), where y=floor(k_av). Moreover, both of the above constraints are met with the two look-up table sizes and two input lengths, requiring a total of three unique look-up table structures at most.

Thus, If a bus width of N is required at the output of encoder 402 for compatibility with the input bus to a DSP components, such as FEC encoder 406, such bus width compatibility may be achieved by generating a codeword a combination of several smaller codewords or codeword portions with different lengths, each of which being supplied by a corresponding look-up table. For example, a bus width or codeword length of N may be achieved with 'a' parallel look-up tables of length 'x', and cb' parallel look-up tables of length 'X+1' for N=aX+b(X+1), as noted above.

Similarly, if a total input of k bits to a set of encoders or look-up tables is required, this constraint may be satisfied using subgroups of input data of lengths, which may not be equal.

Figure 4D:
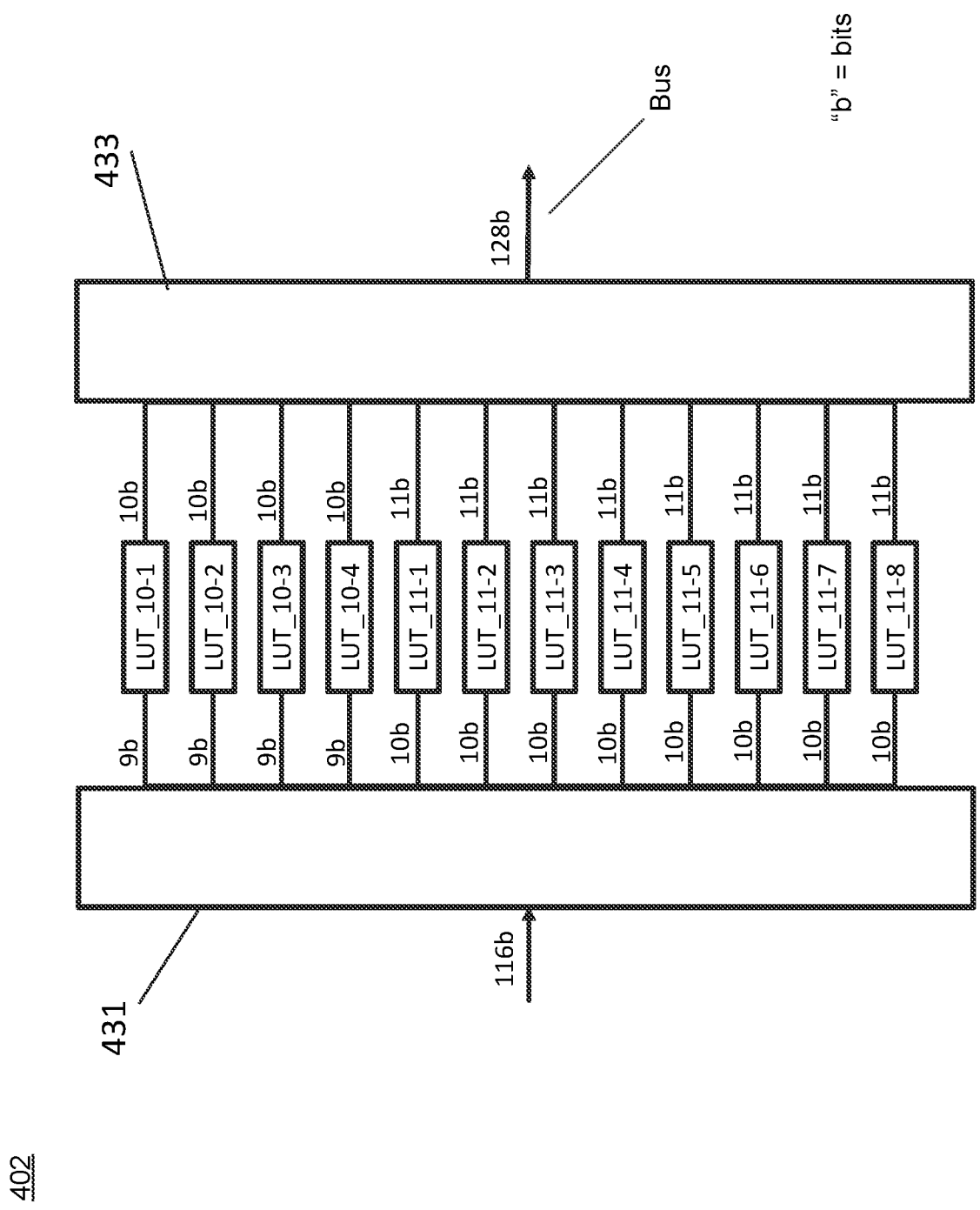

Accordingly, in the example shown in FIG. 4d, a respective 9 bit subgroup of an input data sequence of 116 bits is input to each of look-up tables (LUTs) LUT_10-1 to LUT_10-4 by demultiplexer 431, such that each of these LUTs outputs a corresponding 10 bit portion of the codeword or bus width of 128 bits. In addition, each of LUTs LUT_11-1 to LUT_11-8 receives a respective 10 bit subgroup of the input data sequence from demultiplexer 431, such that each of these LUTs (LUT_11-1 to LUT_11-8) outputs a corresponding 11 bit portion of the codeword assembled in multiplexer or memory 433.

Figure 4E:
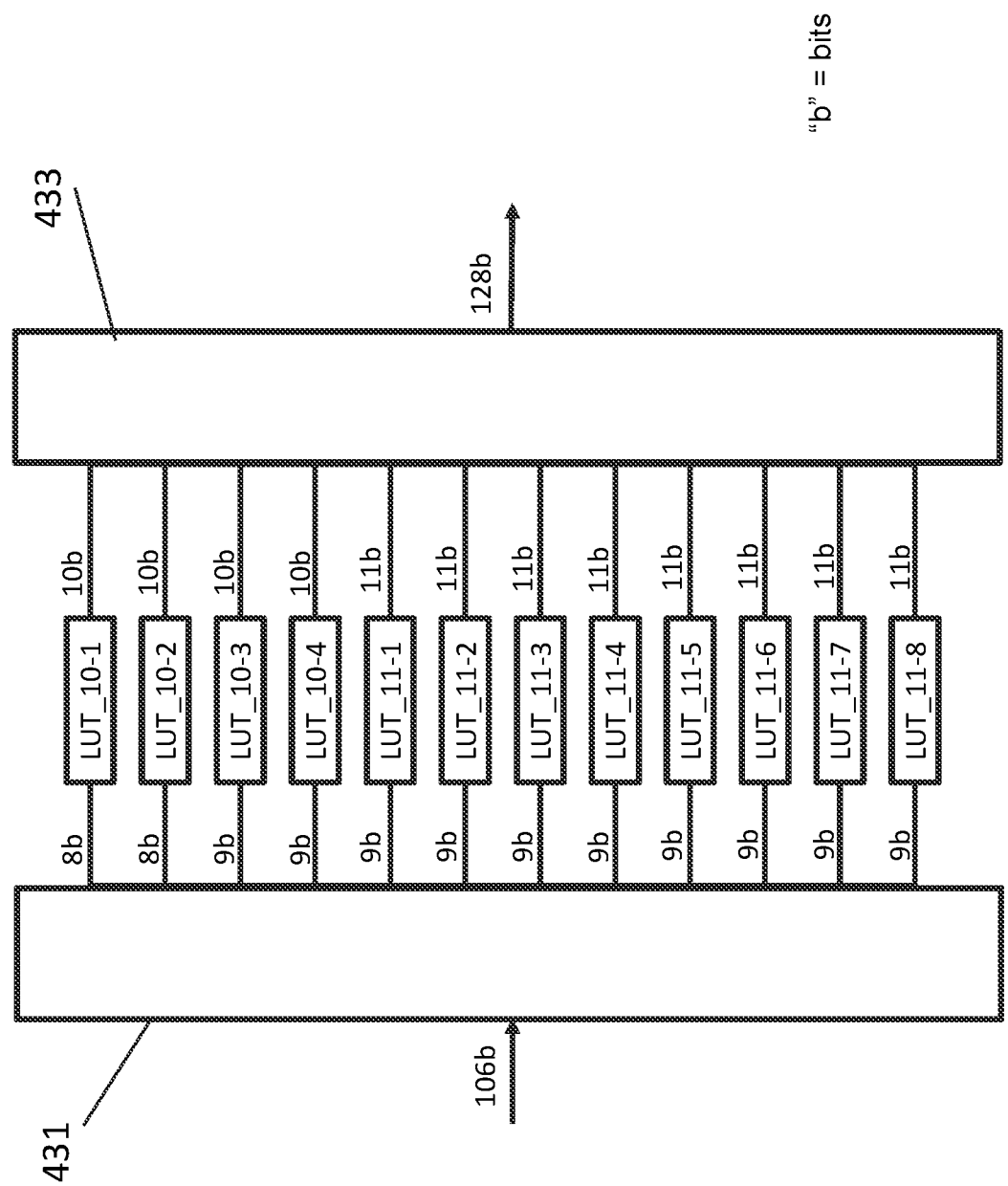

In the example shown in FIG. 4e, a respective 8 bit subgroup of an input data sequence of 106 bits is input to each of look-up tables (LUTs) LUT_10-1 to LUT_10-2 by demultiplexer 431, such that each of these LUTs outputs a corresponding bit portion of the codeword or bus width of 128 bits. In addition, each of LUT 10-3 and 10-4, and LUT_11-1 to LUT_11-8 receives a respective 9 bit subgroup of the input data sequence from demultiplexer 431, such that each of LUT 10-3 and 10-4 outputs a corresponding 10 bit portion of the codeword, and each of LUTs 11-1 to 11-8 outputs a corresponding 11 bit portion of the codeword assembled in multiplexer or memory 433.

Figure 4F:
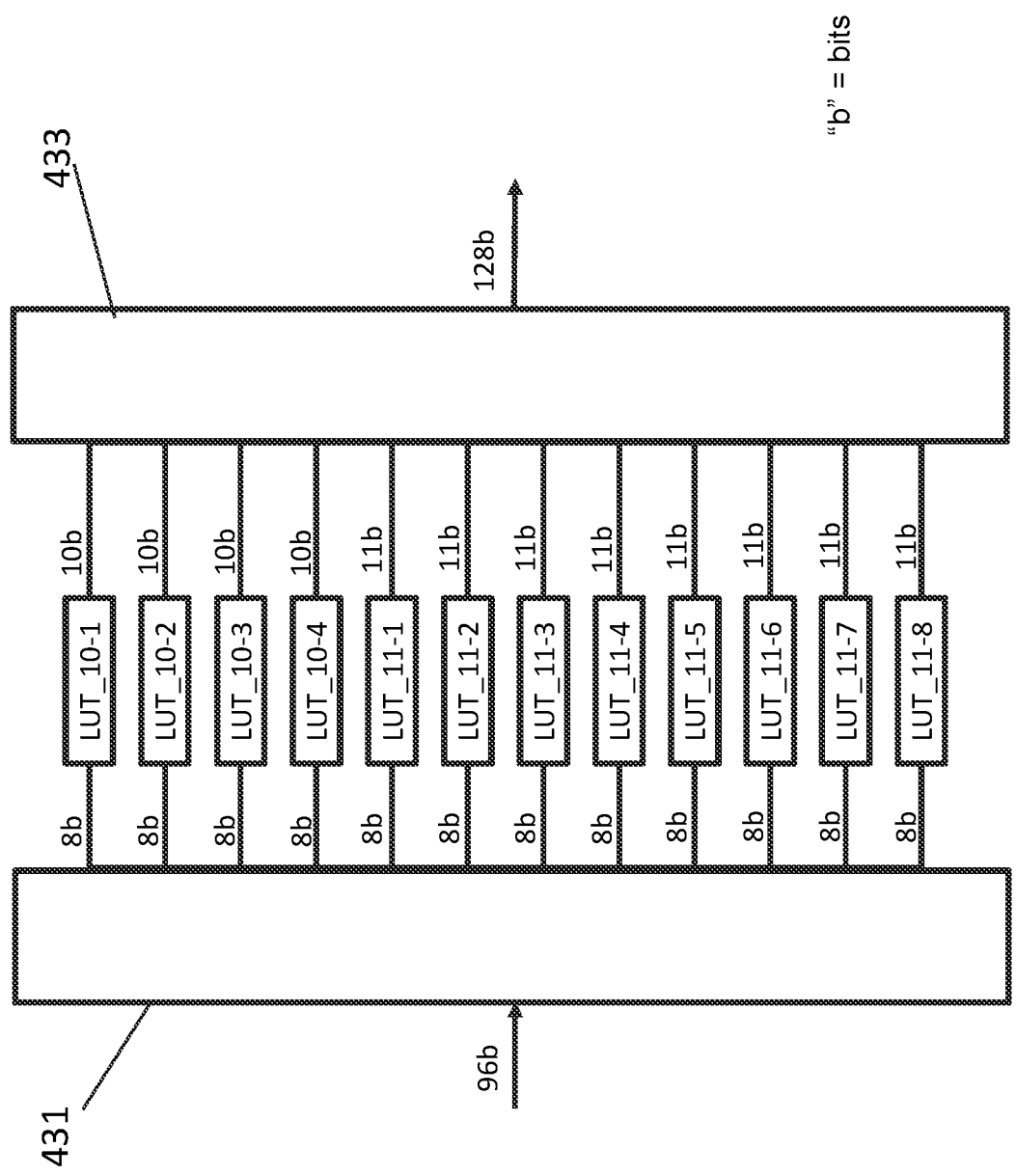

In the example shown in FIG. 4f, a respective 8 bit subgroup of an input data sequence of 96 bits is input to each of look-up tables (LUTs) LUT_10-1 to LUT_10-4 and LUTs 11-1 to 11-8 by demultiplexer 431, such that each of LUTs 10-1 to 10-4 outputs a corresponding 10 bit portion of the codeword or bus width of 128 bits. In addition, each of LUTs 11-1 to LUT_11-8 outputs a corresponding 11 bit portion of the codeword assembled in multiplexer or memory 433.

In the example shown in FIG. 4f, a respective 8 bit subgroup of an input data sequence of 96 bits is input to each of look-up tables (LUTs) LUT_10-1 to LUT_10-4 and LUTs 11-1 to 11-8 by demultiplexer 431, such that each of LUTs 10-1 to 10-4 outputs a corresponding 10 bit portion of the codeword or bus width of 128 bits. In addition, each of LUTs 11-1 to LUT_11-8 outputs a corresponding 11 bit portion of the codeword assembled in multiplexer or memory 433.

In the example shown in FIG. 4g, a respective 6 bit subgroup of an input data sequence of 72 bits is input to each of look-up tables (LUTs) LUT_10-1 to LUT_10-4 and LUTs 11-1 to 11-8 by demultiplexer 431, such that each of LUTs 10-1 to 10-4 outputs a corresponding 10 bit portion of the codeword or bus width of 128 bits. In addition, each of LUTs 11-1 to LUT_11-8 outputs a corresponding 11 bit portion of the codeword assembled in multiplexer or memory 433.

In the example encoder structure shown in FIG. 4h, an output bus or codeword size of 128 bits is desired. This can be achieved with 2 look-up tables (LUTs) of length 12 bits, and 8 LUTs of length 13 bits, as 128=212+8*13. 10 LUTs are therefore used in total.

Figure 4I:
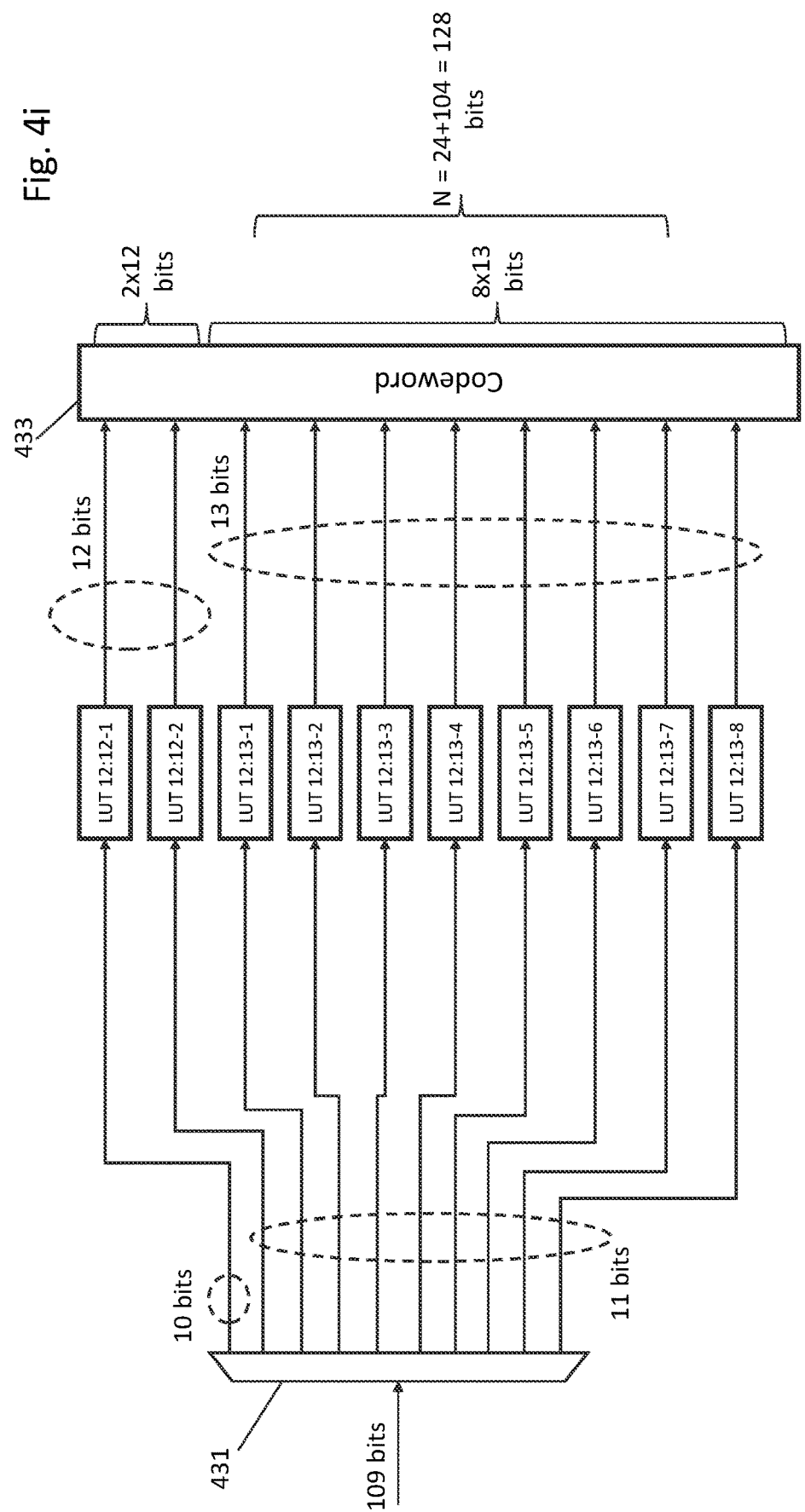

As shown in FIG. 4i, when 109 (k) input bits and 128 LUT output bits per amplitude are required, 10 bits are allocated to a subgroup of input data to one LUT and the remaining LUTs each receive a respective input data subgroup having a length of 11 bits, whereby two of the LUTs shown in FIG. 4i supply respective 12 bit portions of the codeword and the remaining LUTs supply respective 13 bit portions of the codeword to memory 433.

Figure 4J:
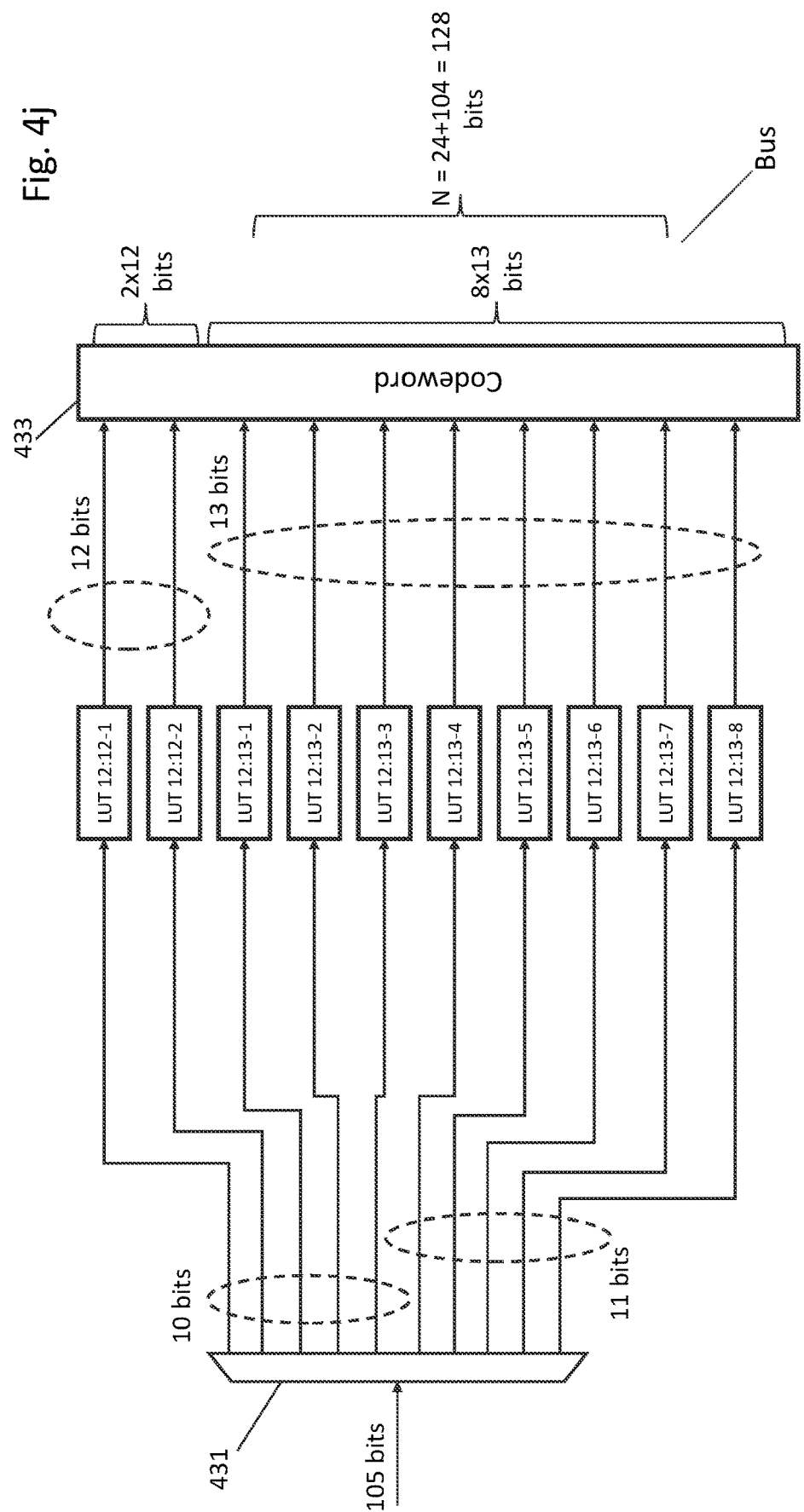

As shown in FIG. 4j, when 105 input bits and 128 LUT bits per amplitude are required, 10 bits are allocated to a respective subgroup of input data supplied to five of the LUTs and each of the remaining five LUTs receive a respective subgroup of 11 bits. As further shown in FIG. 4j, two of the LUTs output a corresponding 12 bit portion of the codeword to memory 433, and each of the remaining LUTs output a respective 13 bit portion of the codeword to memory 433, which, as noted above, collects the codeword portions and outputs them as a complete codeword of the desired length to FEC encoder 406.

Thus, consistent with the present disclosure, by retrieving codeword portions stored in look-up tables, and creating codewords by combining such portion, codewords may be generated in a simplified manner and with reduced power compared to conventional techniques which are more computationally intensive.

Returning to FIG. 3, outputs XI and XQ are provided to pulse shaping, upsampling, and precompensation circuitry 306, which in turn, supplies outputs to digital to analog converters (DACs) 310 and 312. Similarly, outputs Yi and YQ are provided to pulse shaping, upsampling, and precompensation circuitry 308, which similarly supplies outputs to DACs 314 and 316.

As further shown in FIG. 3, DACs 310/312 and 314/316 output corresponding analog signals, which are filtered by low-pass or roofing filters (not shown) to thereby remove, block or substantially attenuate higher frequency components in these analog signals. Such high frequency components or harmonics are associated with sampling performed by DACs 310/312, 314/316 and are attributable to known "aliasing." The filtered analog signals may next be fed to corresponding driver circuits 326/328 and 332/330, which supply modulator driver signals that have a desired current and/or voltage for driving modulators present in PIC 206 (or provided as discrete devices) to provide modulated optical signals having the symbol probability distributions noted above.

Optical source OS-1 on PIC 206 will next be described with reference to FIG. 5. It is understood that remaining optical sources OS-1 to OS-n have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength λ1 to a dual output splitter or coupler 510 (e.g. a 3 db coupler) having an input port and first and second output ports. Typically, the waveguides used to connect the various components of optical source OS-1 may be polarization dependent. A first output 510a of coupler 510 supplies the CW light to first branching unit 511 and the second output 510b supplies the CW light to second branching unit 513. A first output 511a of branching unit 511 is coupled to modulator 506 and a second output 511b is coupled to modulator 512. Similarly, first output 513a is coupled to modulator 526 and second output 513b is coupled to modulator 530. Modulators 506, 512, 526 and 530 may be, for example, Mach Zehnder (MZ) modulators. Each of the MZ modulators receives CW light from DFB 508 and splits the light between two (2) arms or paths. An applied electric field in one or both paths of a MZ modulator creates a change in the refractive index to induce phase and/or amplitude modulation to light passing through the modulator. Each of the MZ modulators 506, 512, 526 and 530, which collectively can constitute a nested modulator, are driven with data signals or drive signals supplied via driver circuits 326, 328, 330, and 332, respectively. The CW light supplied to MZ modulator 506 via DFB 508 and branching unit 511 is modulated in accordance with the drive signal supplied by driver circuit 326. The modulated optical signal from MZ modulator 506 is supplied to first input 515a of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 328. The modulated optical signal from MZ modulator 512 is supplied to phase shifter 514 which shifts the phase of the signal 90° ($\pi/2$) to generate one of an in-phase (I) or quadrature (Q) components, which is supplied to second input 515b of branching unit 515. The modulated data signals from MZ modulator 506, which include the remaining one of the I and Q components, and the modulated data signals from MZ modulator 512, are supplied to polarization beam combiner (PBC) 538 via branching unit 515.

Modulators 506, 512, 526, and 530 may be individually or collectively referred to here in as a "modulator".

Modulator driver 330 supplies a third drive signal for driving MZ modulator 526. MZ modulator 526, in turn, outputs a modulated optical signal as either the I component or the Q component. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 508 is rotated by polarization rotator 524 and is supplied to MZ modulator 526 via first output 513a of branching unit 513. MZ modulator 526 then modulates the polarization rotated CW light supplied by DFB 508, in accordance with drive signals from driver circuit 330. The modulated optical signal from MZ modulator 526 is supplied to first input 517a of branching unit 517.

A fourth drive signal is supplied by driver 332 for driving MZ modulator 530. The CW light supplied from DFB 508 is also rotated by polarization rotator 524 and is supplied to MZ modulator 530 via second output 513b of branching unit 513. MZ modulator 530 then modulates the received optical signal in accordance with the drive signal supplied by driver 432. The modulated data signal from MZ modulator 530 is supplied to phase shifter 528 which shifts the phase the incoming signal 90° ($\pi/2$) and supplies the other of the I and Q components to second input 517b of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538a of polarization beam combiner (PBC) 538. The modulated data signal from MZ modulator 530 is supplied to second input port 538b of polarization beam combiner (PBC) 538. PBC 538 combines the four modulated optical signals from branching units 515 and 517 and outputs a multiplexed optical signal having wavelength λ1 to output port 538c. In this manner, one DFB laser 508 may provide a CW signal to four separate MZ modulators 506, 512, 526 and 530 for modulating at least four separate optical channels by utilizing phase shifting and polarization rotation of the transmission signals. Although rotator 536 and PBC 538 are shown on the PIC, it is understood that these devices may instead be provided off-PIC.

In another example, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508a of DFB 508 supplies CW light to branching unit 511 connected to MZ modulators 506 and 512. The back facet or second output 508b of DFB 508 supplies CW light to branching unit 513 connected to MZ modulators 526 and 530 via path or waveguide 543 (represented as a dashed line in FIG. 5a). The dual output configuration provides sufficient power to the respective MZ modulators at a power loss far less than that experienced through 3 dB coupler 510. The CW light supplied from second output 508b is supplied to waveguide 543 which is either coupled directly to branching unit 513 or to polarization rotator 524 disposed between DFB 508 and branching unit 513. Polarization rotator 524 rotates the polarization of CW light supplied from second output 508b of DFB 508 and supplies the rotated light to MZ modulator 526 via first output 513a of branching unit 513 and to MZ modulator 530 via second output 513b of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508b of DFB 508 before modulation.

As noted above, the modulated optical signals output from each of modulators 506, 512, 526, and 530 carry modulation symbols that are carried by the modulated optical signals in accordance with a transmission probability distribution in accordance with a corresponding codeword(s) output from the DM encoder(s). Each of the modulated optical signals, therefore, may have a desired SE.

As further noted above, optical signals output from transmitter block 12-1 are combined with optical signals output from remaining transmitter blocks 12-2 to 12-n onto optical communication path 16 and transmitted to receive node 18 (see FIG. 1). In receive node 18, demultiplexer 20 divides the incoming signals into optical signal groupings, such that each grouping is fed to a corresponding one of receiver blocks 22-1 to 22-n.

Figure 6:
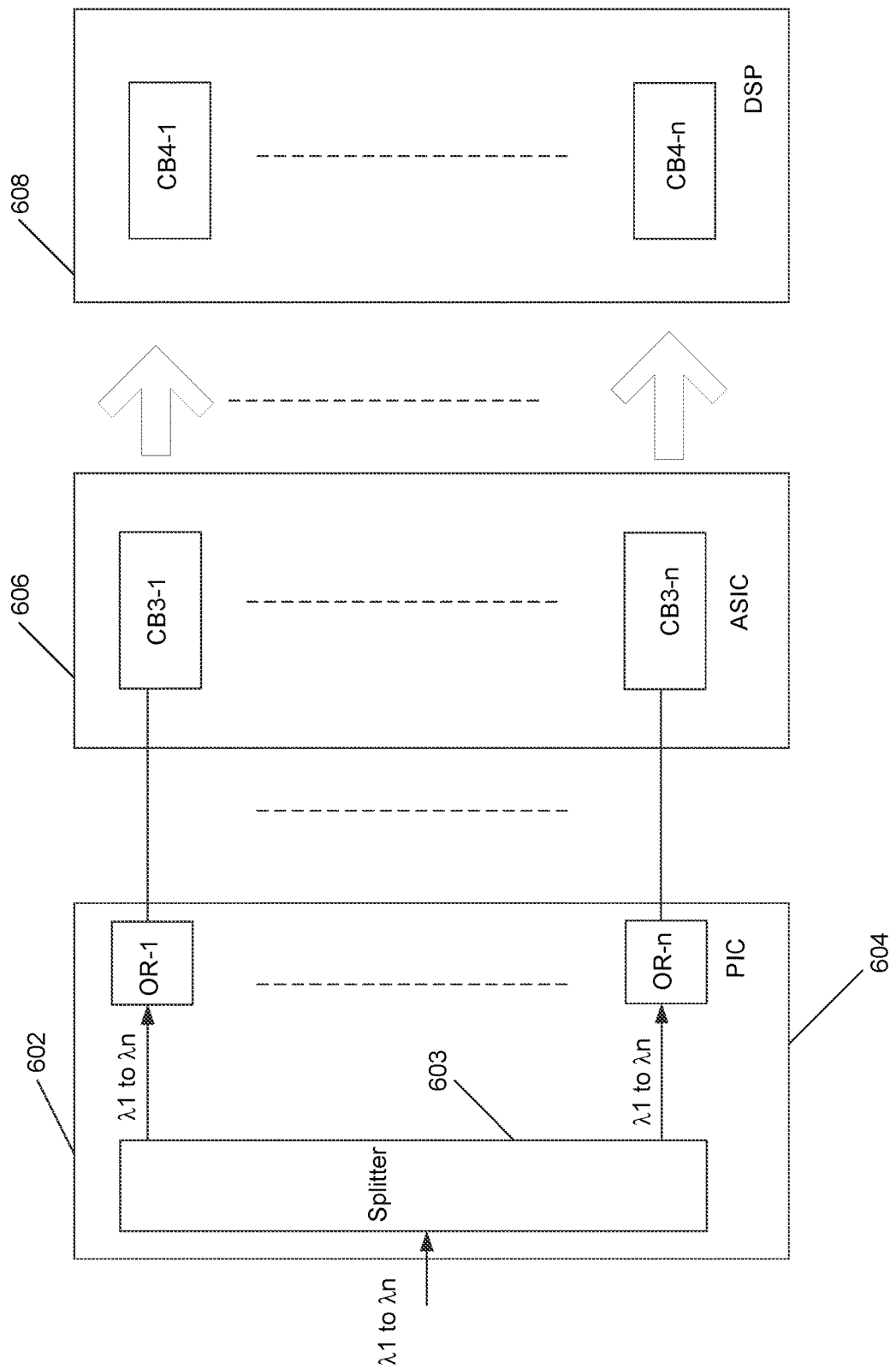
FIG. 6 illustrates a block diagram of a receive block consistent with an aspect of the present disclosure.

One of receiver blocks 22-1 is shown in greater detail in FIG. 6. It is understood that remaining receiver circuitry or blocks 22-2 to 22-n have the same or similar structure as receiver block 22-1.

Receiver block 22-1 includes a receive PIC 602 provided on substrate 604. PIC 602 includes an optical power splitter 603 that receives optical signals having wavelengths λ1 to λ10, for example, and supplies a power split portion of each optical signal (each of which itself may be considered an optical signal) to each of optical receivers OR-1 to OR-n. Each optical receiver OR-1 to OR-n, in turn, supplies a corresponding output to a respective one of circuit blocks CB3-1 to CB3-n of ASIC 606, and each of circuit blocks CB3-1 to CB3-n, supplies a respective output to a corresponding one of circuit blocks CB4-1 to CB4-n of DSP 608. DSP 608, in turn, outputs a copy of data Data-1 in response to the input to circuit blocks CB4-1 to CB4-n.

Figure 7:
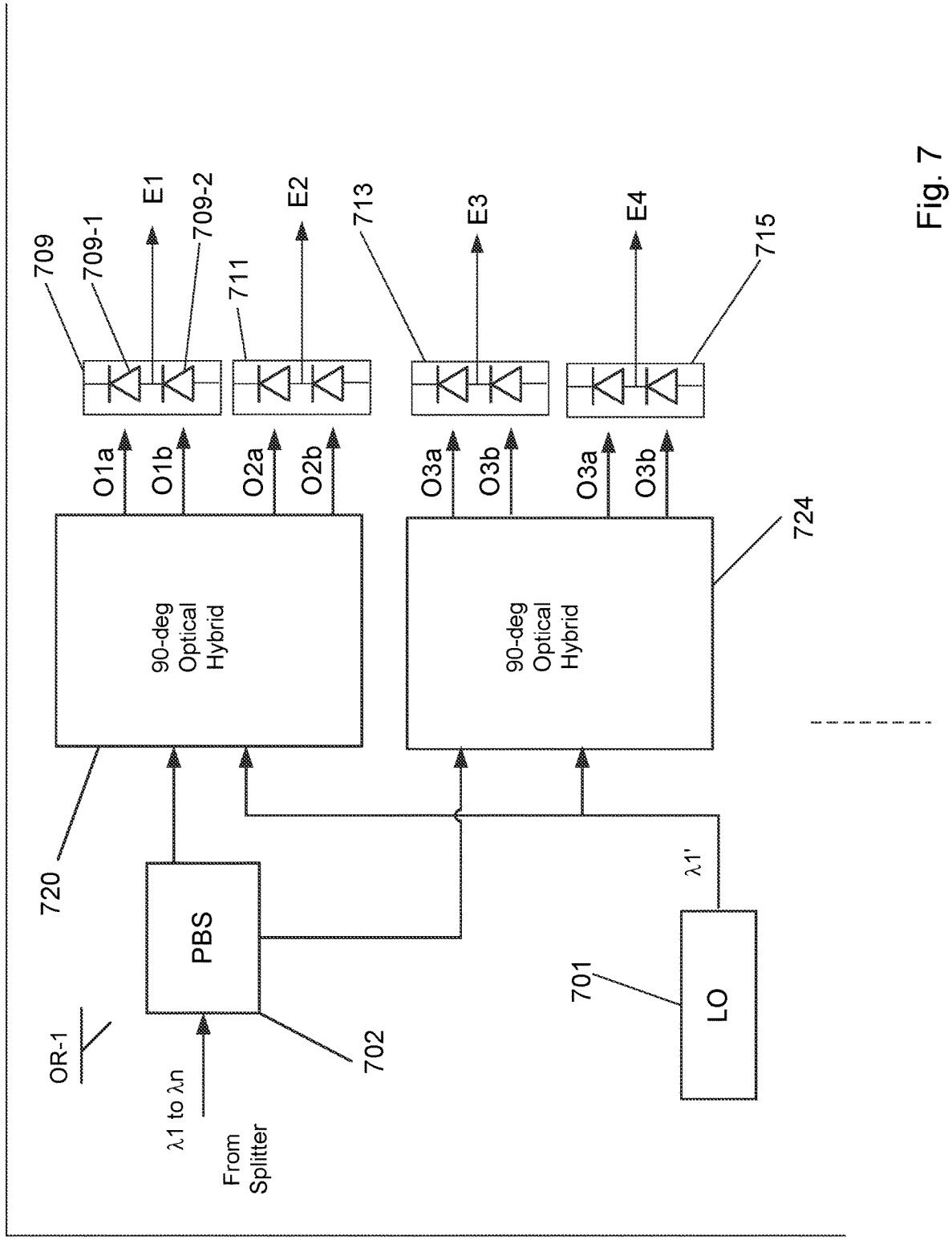
FIG. 7 illustrates a portion of a receiver photonic integrated circuit consistent with the present disclosure.

Optical receiver OR-1 is shown in greater detail in FIG. 7. It is understood that remaining optical receivers OR-2 to OR-n have the same or similar structure as optical receiver OR-1. Optical receiver OR-1 may include a polarization beam splitter (PBS) 702, which may be provided on or off substrate 604 operable to receive polarization multiplexed optical signals $\lambda 1$ to $\lambda 10$ and to separate the signal into X and Y orthogonal polarizations, i.e., vector components of the optical E-field of the incoming optical signals transmitted on optical communication path 16. The orthogonal polarizations are then mixed in 90-degree optical hybrid circuits ("hybrids") 720 and 724 with light from local oscillator (LO) laser 701 having wavelength $\lambda 1$ or a wavelength that differs slight from wavelength $\lambda 1$ so that the incoming light "beats" with the local oscillator light. Hybrid circuit 720 outputs four optical signals O1a, O1b, O2a, O2b and hybrid circuit 724 outputs four optical signals O3a, O3b, O4a, and O4b, each representing the in-phase and quadrature components of the optical E-field on X (TE) and Y (TM) polarizations, and each including light from local oscillator 701 and light from polarization beam splitter 702. Optical signals O1a, O1b, O2a, O2b, O3a, O3b, O4a, and O4b are supplied to a respective one of photodetector circuits 709, 711, 713, and 715. Each photodetector circuit, for example, may include a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals $\lambda 1$ to $\lambda 10$ input to PBS 702 demodulated with LO 701 ($\lambda 1$). For example, these electrical signals may comprise four base-band analog electrical signals linearly proportional to the in-phase and quadrature components of the optical E-field on X and Y polarizations.

Figure 8:
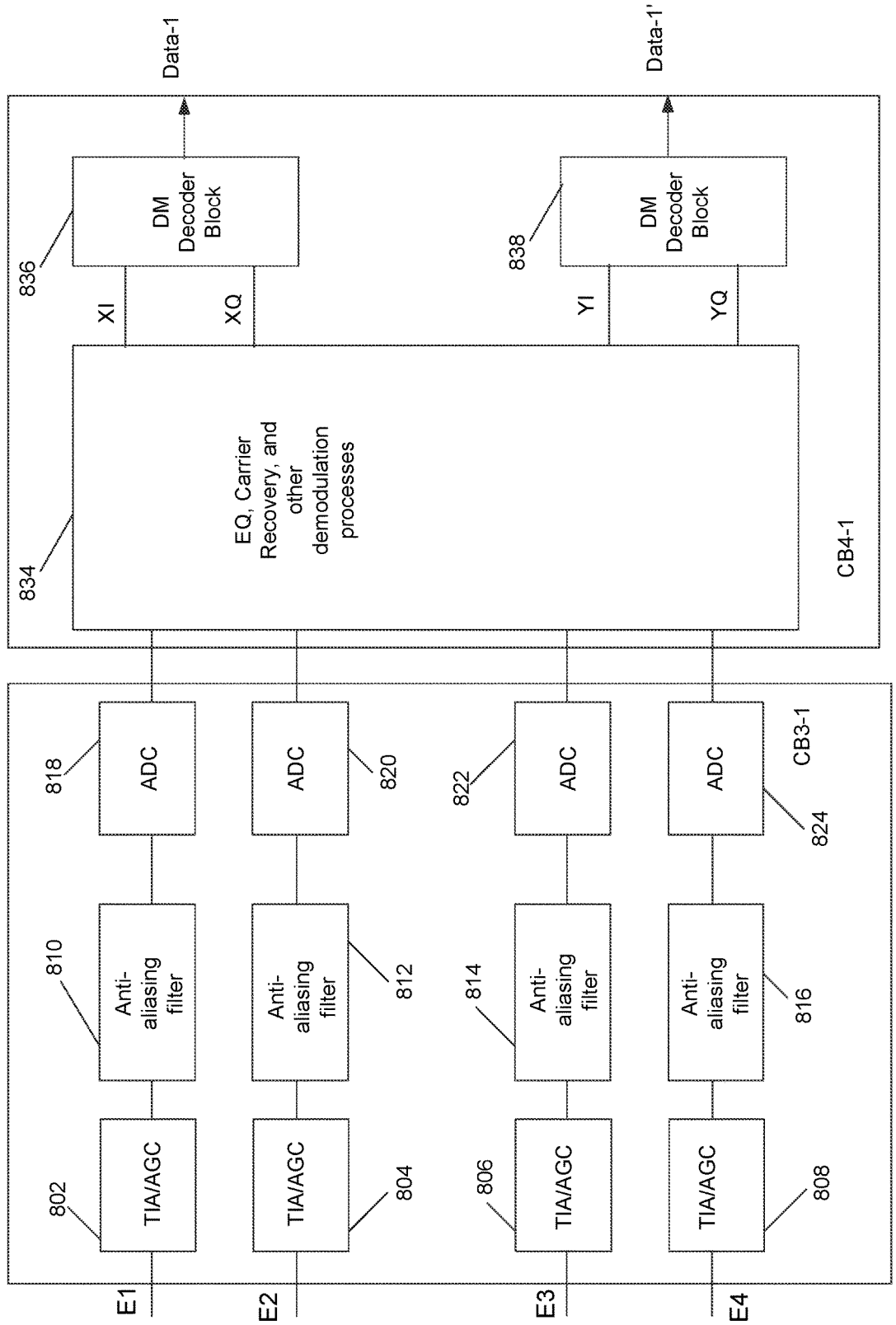
FIG. 8 illustrates a portion of the receive block shown in FIG. 6.

FIG. 8 shows circuitry or circuit blocks CB3-1 and CB4-1 in greater detail. It is understood that remaining circuit blocks CB3-2 to CB3-n of AS IC 606 have a similar structure and operate in a similar manner as circuit block CB3-1. In addition, it is understood that remaining circuit blocks CB4-2 to CB4-n of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Each of circuitry 802, 804, 806, and 808, in turn, supplies corresponding electrical signals or outputs to respective ones of anti-aliasing filters 810, 812, 814, and 816, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate, as described in greater detail in U.S. Pat. No. 8,477,056, the entire contents of which are incorporated herein by reference.

As further shown in FIG. 8, digital outputs of ADCs 818, 820, 822, and 824 are supplied to circuit block 834, which may carry out equalization, carrier recovery, and other demodulation processing on such ADC outputs to provide outputs XI, XQ, Yi, and YQ corresponding to XI, XQ, YI, and YQ discussed above in connection with FIGS. 3 and 4a above. Outputs XI and XQ are provided to decoder block 836, and YI, and YQ are provided to DM decoder block 838 (see FIG. 8).

Figure 9:
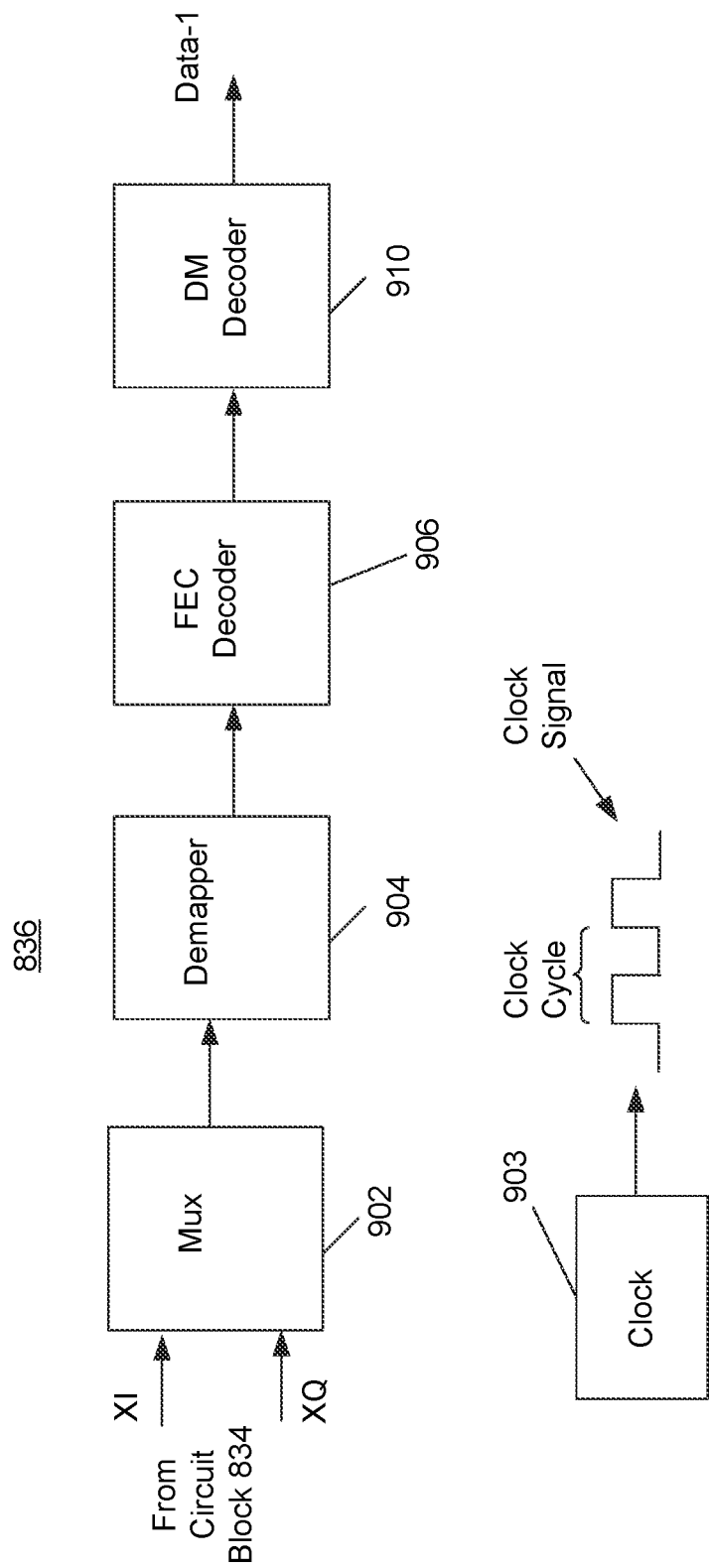
FIG. 9 illustrates a decoder circuit consistent with an additional aspect of the present disclosure.

FIG. 9 shows decoder block 836 in greater detail. It is understood that decoder block 838 has the same or similar structure as decoder block 836. In addition, decoder block 838 operates in the same or similar manner as decoder block 836. Decoder block 834 may include a multiplexer 902 that multiplexes the in-phase (XI) and quadrature (Q) symbols output from circuit block 834. The multiplex output is supplied to a demapper circuit 904, which calculates soft or hard information regarding the bits that are carried by the symbols and supplies an output to FEC decoder 906. FEC decoder 906 decodes the encoded symbols and thus carries out the inverse operation as labelling circuit 404. DM decoder 910 next decodes the codeword symbols of each codeword to provide a copy of each input data sequence (Data-1) supplied to DM encoder 402 every n clock signals, for example, of the clock signal output from clock 903. The codeword is based on electrical signals, such as E1 and E2 output from balanced photodiodes shown in FIG. 7. The operation of DM decoder 910 is discussed in greater detail below.

Section 2—Encoding Input Bit Sequences to Generate Codewords

Additional details of the operation of DM encoder 402 will next be described with reference to FIGS. 10-19c.

FIG. 10 illustrates an example of a series of input bit sequences, each having k=3 bits, and corresponding codewords, each having n=5 symbols. Here, each symbol of the codeword is represented by a single bit. It is within the scope of the present disclosure, however, that multi-bit symbols may represent each codeword, wherein the codeword symbols may constitute any arbitrary alphabet, i.e., codeword symbols having values other than "0" and "1", may be encoded. The encoding described in the present examples may employ fixed-point precision in which the input data sequences, for example, are represented by a fixed number of digits or fixed-point representations. It is understood that the encoding and decoding described herein is exemplary. Other codeword lengths and other arbitrary alphabets are contemplated. In addition, the encoding and decoding described herein may be employed to encode and decode codewords indicative of the probability distributions associated with symbols and constellations points carried by optical signals modulated in accordance with an m-QAM modulation form, where m is greater than or equal to 16. Such modulation formats may have three, four, five or more amplitude levels.

Figure 11:
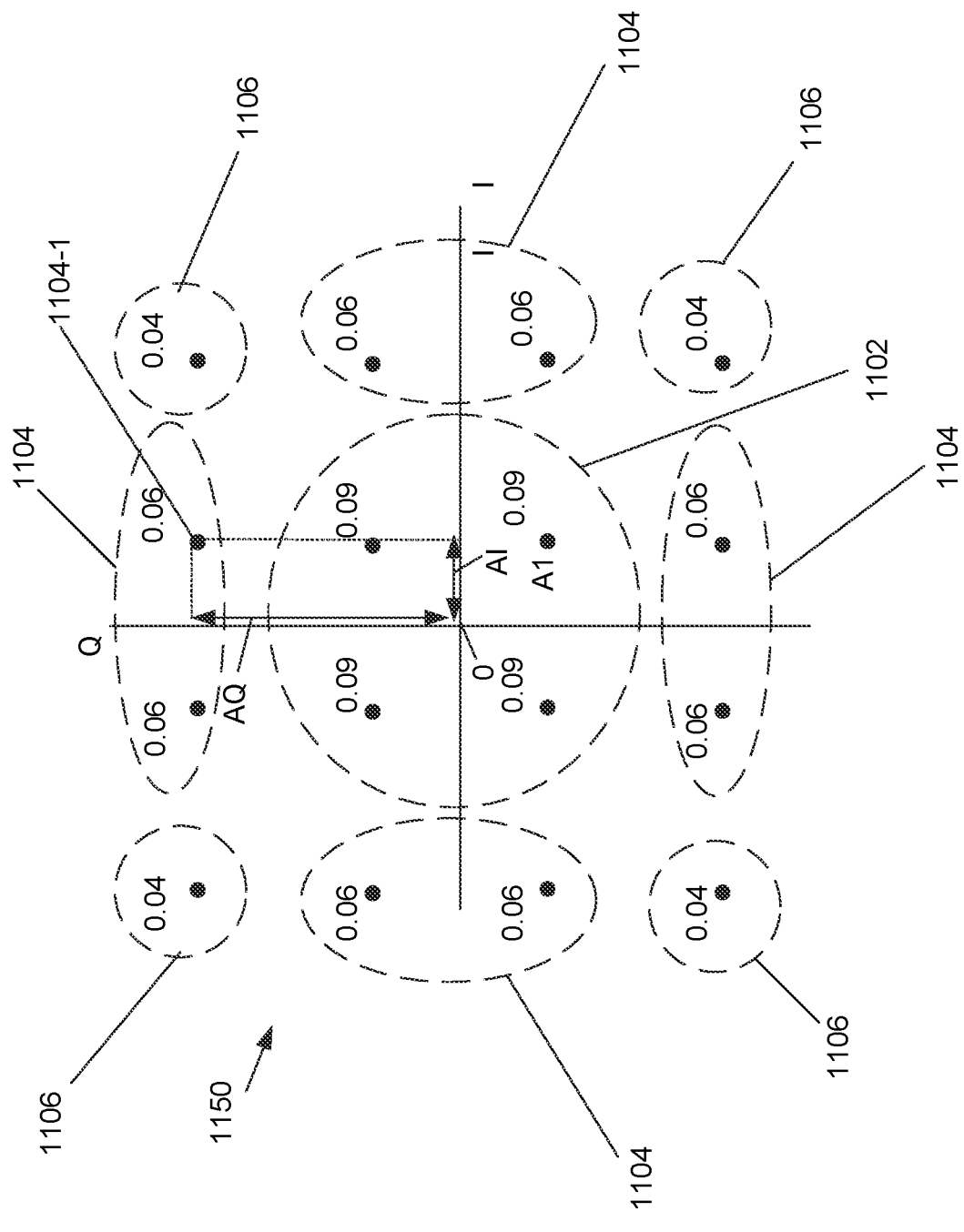
FIG. 11 illustrates an example of a constellation and transmission probabilities for the codewords shown in FIG. 10.

In the example shown in FIG. 10, each codeword has three "1"s and two "0" s. The three "1"s represent a 60% probability (⅗) of transmission of a lower amplitude (i.e., inner constellation point) of the in-phase component and a 60% probability of low amplitude (inner constellation point) of the quadrature component. Consistent with the present disclosure, FIG. 11 shows an example of a 16 QAM constellation 1100. Each point of the constellation is labeled with its corresponding transmission probability, which is determined based on codewords similar to those shown in FIG. 10. Each point may be defined by an in-phase amplitude and a quadrature amplitude. Each amplitude being defined by the alphabet {0, 1, 2}, where symbols 1 and 2 define points having a particular distance from the origin 0 of the IQ plane 1150 and the 0 symbol identifies which whether the constellation point is located along the positive or negative sections of the I and Q axes. Thus, for example, point 1104-1 is defined by an amplitude along the I axis corresponding to first symbol (the "0" of the alphabet) that designates the positive I axis, in this example. The I amplitude further being defined by second/third symbols (the "1" and "2") of the alphabet, such that the amplitude has a magnitude AI in FIG. 11. Point 1104-1 is further defined by an amplitude along the Q axis corresponding to first symbol (the "0" of the alphabet) that designates the positive Q axis, in this example. The amplitude further being defined by second/third symbols (the "1" and "2") of the alphabet, such that the amplitude has a magnitude AQ in FIG. 11. The remaining points in the constellation are defined in a similar fashion by codewords encoded and decoded, as described below.

In the example shown in FIG. 11, the codewords designate a 60% probability of transmission of lower amplitude in-phase and quadrature components and result in the transmission probabilities for the constellation points shown in FIG. 11. Namely, each of the inner (low amplitude) points 1102 with amplitude AI have a 9% symbol transmission probability; each of middle (intermediate) points 1104 has a 6% symbol transmission probability; and each of outer (high) amplitude points 1106 has a 4% symbol transmission probability. Thus, points 1102 are transmitted more frequently than points 1104, which, in turn, are transmitted more frequently than points 1106. The sum of each of these probabilities is one (100%). The fixed-point processing of input bit sequences described herein may be employed to encode and decode codewords corresponding to the probability distribution shown in FIG. 11 or any other probability distribution. Examples of other codewords and corresponding probability distributions for a 64 QAM constellation (optical signals modulated in accordance with a 64 QAM modulation format) are discussed below with reference to FIGS. 34-38. Such codewords may also generated in a manner similar to that described above in which the codewords may define amplitude along the I and Q axes that define each constellation point. Consistent with the present disclosure, based on such codewords, optical signals modulated with the modulators disclosed herein may generate sequences of modulation symbols, each corresponding to a respective constellation points (e.g., symbols 0010 and 0000 associated with a respective one of points 1106; symbols 1111 and 0111 associated with a respective one of points 1102) in FIG. 11, wherein certain symbols, such as those associated with constellation points 1102 (having amplitude A1), for example, are transmitted more frequently than modulation symbols associated with constellation points 1106 having amplitude A3. Encoding and decoding of such symbols and codewords is discussed in greater detail below.

Figure 12:
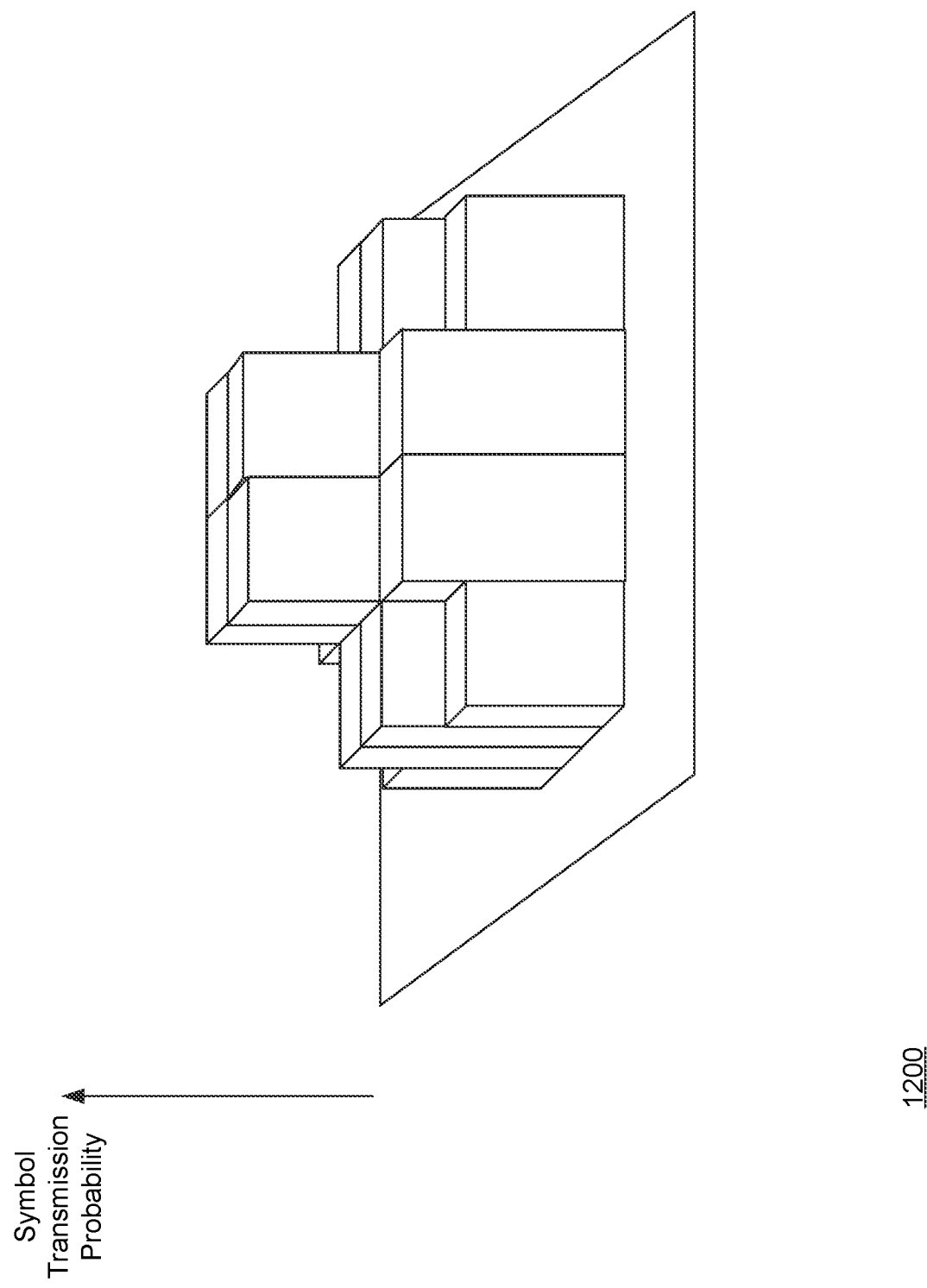
FIG. 12 graphically illustrates a transmission probability distribution corresponding to the probabilities shown in FIG. 11.

FIG. 12 illustrates a three-dimensional representation 1200 of the symbol transmission probabilities shown in FIG. 11.

In the above examples, each modulated optical signal output from each of the Tx Blocks 12-1 to 12-n is associated with a respective laser, such as laser 508 (see FIG. 5) and each carries data indicative of a corresponding codeword. Accordingly, each such modulated optical signal or channel has a desired transmission probability distribution, as further discussed above. Consistent with the present disclosure, however, multiple channels or subcarriers may be output from each of optical source, such as OS-1 shown in FIG. 2, and each such subcarrier may carry data indicative of a corresponding codeword. Accordingly, each subcarrier may have a desired transmission probability distribution, as further discussed above.

Figure 13:
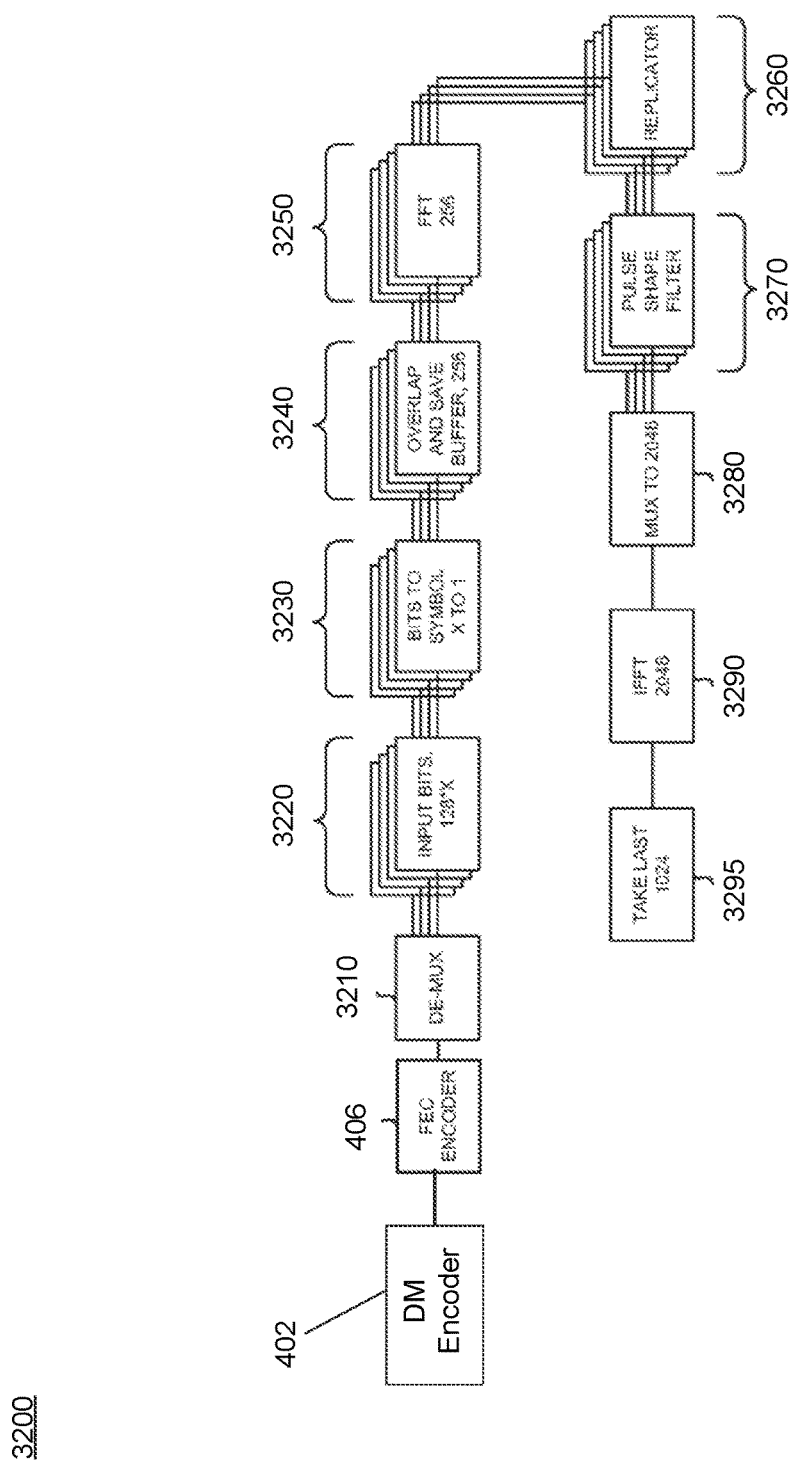
FIG. 13 illustrates an additional example of a portion of an optical transmitter consistent with an aspect of the present disclosure.
Figure 14:
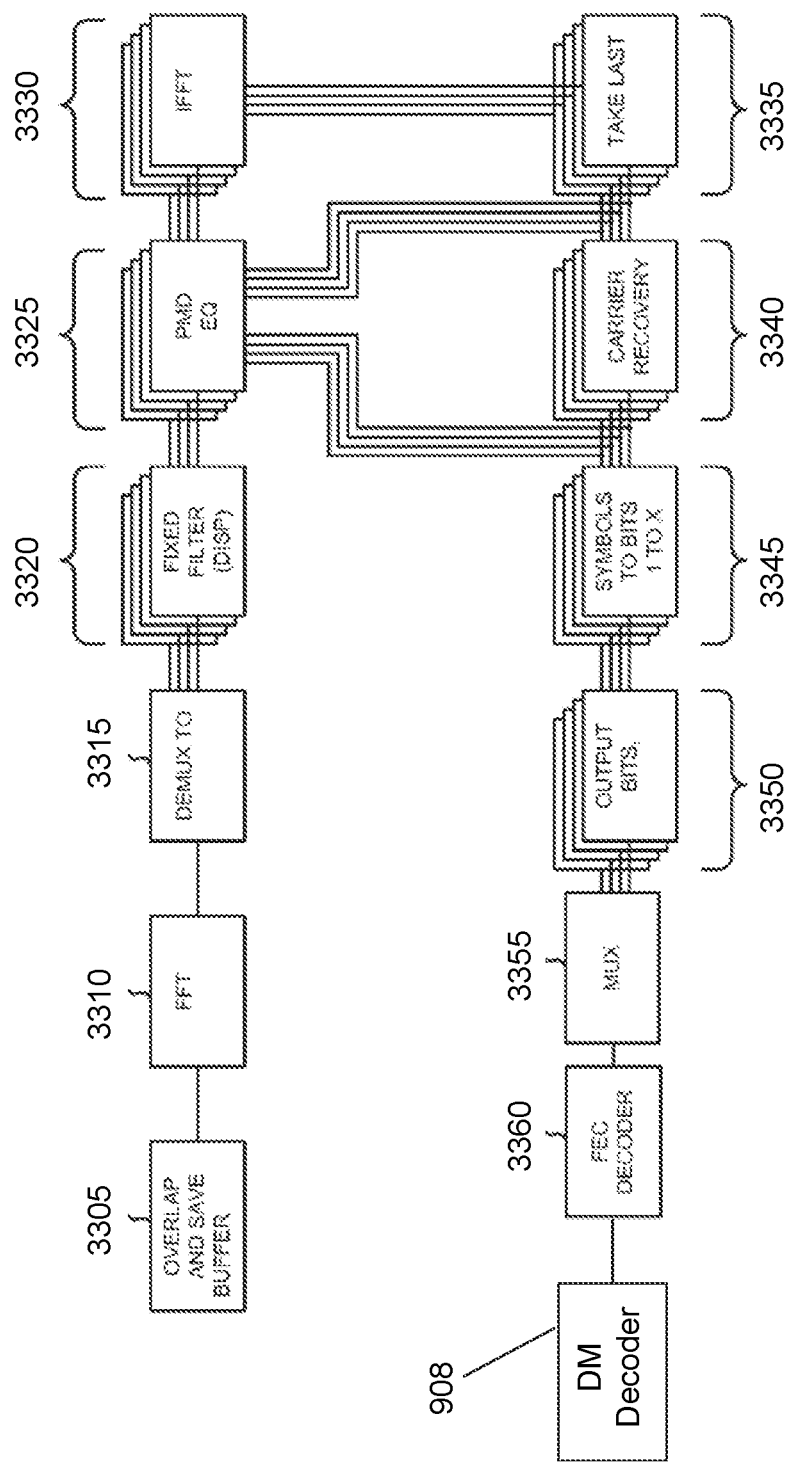
FIG. 14 illustrates an additional example of a portion of an optical receiver consistent with an aspect of the present disclosure.

FIG. 13 shows an example of circuit block CB1-1 that may be employed to generate digital subcarriers and based on such digital subcarrier optical subcarriers or Nyquist subcarriers that may not overlap in frequency may be output from the TX blocks 12. Moreover, such Nyquist subcarriers may each be modulated in accordance with a desired probability distribution, as noted above.

As shown in FIG. 13, CB1-1 (shown as transmitter block 3200) may include a DM encoder (402) and FEC encoder (406) circuits similar to or the same as that discussed above in connection with FIG. 4a. However, FEC encoder circuit 406 may, instead of supplying bits or symbols to QAM mapper 408, supply such bits or symbols to a demultiplexer or de-mux component 3210, which demultiplexes the bits received from FEC encoder 406. In this example, de-mux component 3210 may separate the stream of bits into groups of bits associated with four subcarriers, however, it is understood that de-mux components may separate the received bits into another number of subcarriers. In some implementations, the bits may be separately or jointly encoded for error correction in de-mux component 3210, using forward error correction. De-mux component 3210 may use the error correction encoding to separate the bits for the different subcarriers. De-mux component 3210 may be designed to systematically interleave bits between the subcarriers. De-mux component 3210 may also be designed to generate timing skew between the subcarriers to correct for skew induced by link 16 (see FIG. 1). De-mux component 3210 may provide each group of bits to a corresponding input bits component 3220. Input bits component 3220 may process 128*X bits at a time, where X is an integer. It is noted that the circuitry shown in FIG. 13 may include more components or fewer components than that shown in the drawing. Additional features are not shown for ease of explanation.

Bits to symbol component 3230 may map the bits to symbols on the complex plane. For example, bits to symbol component 3230 may map a number of bits to a symbol in a 16 QAM constellation, although m-QAM constellations are contemplated herein, where m is an integer that is greater than or equal to 16. Overlap and save buffer 3240 may buffer a predetermined number of symbols. Overlap and save buffer 3240 may receive a desired number of symbols at a time from bits to symbol component 3230. Thus, overlap and save buffer 3240 may combine new symbols, from bits to symbol component 3230, with the previous symbols received from bits to symbol component 3230.

FFT component 3250 may receive symbols from overlap and save buffer 3240 and convert the symbols to the frequency domain using, for example, a fast Fourier transform (FFT). FFT component 3250 may form frequency bins or bit sequences corresponding to frequency components of the subcarriers as a result of performing the FFT. Replicator component 3260 may replicate the frequency bins to form additional frequency bins (e.g., for T/2 based filtering of the subcarrier) to thereby increase the sample rate.

Pulse shape filter 3270 may apply a pulse shaping filter to the frequency bins to calculate transitions between the symbols and the desired spectrum so that the corresponding optical subcarriers can be packed together spectrally during transmission. Pulse shape filter 3270 may also be used to introduce timing skew between the subcarriers to correct for timing skew induced by link 230. Mux component 3280 may receive the subcarriers (from the pulse shape filters 3270) and multiplex them together to form an element vector.

IFFT component 3290 may receive the element vector to convert back to the time domain. IFFT component 3290 may convert the signal to the time domain using, for example, an inverse fast Fourier transform (IFFT). Take last component 3295 may select a predetermined number of the last samples output from IFFT component 3290 and output such samples to DAC 310 and DAC 312, for example.

Figure 5:
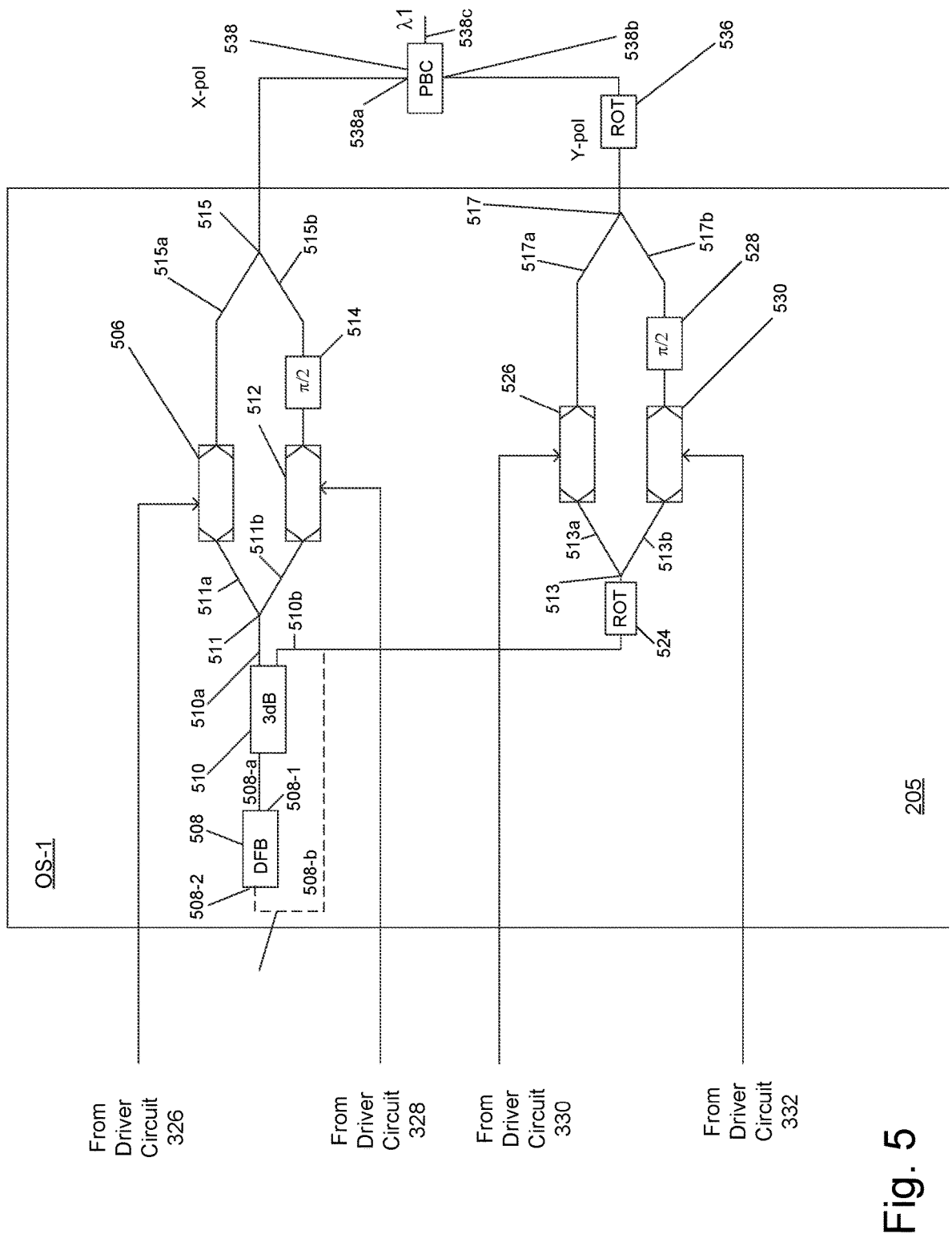
FIG. 5 illustrates a portion of transmit photonic integrated circuit consistent with the present disclosure.

While FIG. 5 shows circuitry 3200 as including a particular quantity and arrangement of functional components, in some implementations, circuitry 3200 may include additional functional components, fewer functional components, different functional components, or differently arranged functional components.

As noted above, the outputs of the DAC 310 and 312 may provide inputs to driver circuits 326, which, in turn, supply drive signals to modulators 506 and 512. As further discussed above, based on such drive signals, the modulators output modulated optical signals. Here, such modulated optical signals may include optical subcarriers corresponding to the digital subcarriers discussed in connection with FIG. 13.

It is noted that additional circuitry, similar to that shown in FIG. 13 may also be employed to generate outputs to DACs 314 and 316 that supply signals to drivers 330 and 332 (see FIG. 3). As noted above, such drive signals may be used to drive modulators 526 and 530 to output optical subcarriers. The optical subcarriers output at 515 in FIG. 5 may be carried by a TE or X component of the modulated optical signals, while the optical subcarriers generated at 517 in FIG. 5 may be carried by the TM or Y component of the modulated optical signal.

As noted above, optical signals are transmitted from a transmit end of optical communication path or link 16 to a receive end. Optical subcarriers, as further noted above, similarly propagate along the path or link 16 to a receiver. The optical subcarrier, in a manner similar to that described above, are likewise provided to a an optical demultiplexer 20 or power splitter shown in FIG. 1, and power split portions of the optical subcarriers are provided to a polarization beam splitter, as shown in FIG. 7. The TE and TM components of the optical subcarriers are mixed with local oscillator light in a manner similar to that described above, and the resulting mixing products are provided to photodiodes 709, 711, 713, and 715, as further shown in FIG. 7.

The outputs of the photodiodes are subject to further processing by circuitry in circuit block CB3-1, including analog-to-digital conversion (ADC) circuits 818, 820, 822, and 824 show in FIG. 8.

As further shown in FIG. 8, the outputs of ADC circuits 818, 820, 822, and 824 provide digital outputs that may be processed by a digital signal processor (DSP) including, in the case of subcarrier transmission noted above, the circuitry shown in FIG. 14. Namely, samples output from ADC circuits 818, 820, 822, and 824 may be provided to overlap and save buffer 3305, which may receive such samples from the ADC circuits, and combine those samples with previously received samples to form vector elements. FFT component 3310 may receive the vector elements from overlap and save buffer 3305 and convert the vector elements to the frequency domain using, for example, a fast Fourier transform (FFT). FFT component 3310 may convert the vector elements to corresponding frequency "bins" or sequences as a result of performing the FFT.

De-mux component 3315 may receive the frequency bins from FFT component 3310. De-mux component 3315 may demultiplex the frequency bins to element vectors, for example, one element vector for each of subcarrier. Filter 3320, which may be a fixed filter, may apply a filtering operation for, for example, dispersion compensation and may compensate for the relatively slow varying parts of the channel. Fixed filter 3320 may also compensate for skew across subcarriers introduced in the link or skew introduced intentionally in one of optical transmitters 12.

PMD component 3325 may apply polarization mode dispersion (PMD) equalization to compensate for PMD and polarization rotations. PMD component 3325 may also receive and operate based upon feedback signals from take last component 3335 and/or carrier recovery component 3340.

IFFT component 3330 may covert the element vectors (after processing by fixed filter component 3340 and PMD component 3325) back to the time domain as a predetermined number of samples. IFFT component 3330 may then convert the element vectors to the time domain using, for example, an inverse fast Fourier transform (IFFT). Take last component 3335 may select the last q (q being a positive integer) samples from IFFT component 3330 and output the q samples to carrier recovery component 3340.

Carrier recovery component 3340 may apply carrier recovery to compensate for transmitter and receiver laser linewidths. In some implementations, carrier recovery component 3340 may perform carrier recovery to compensate for frequency and/or phase differences between the transmit signal and the signal from local oscillator 701 (see FIG. 7). After carrier recovery, the data may be represented as symbols in the QPSK constellation. In some implementations, as described above, the output of take last component 3335 and/or carrier recovery component 3340 could be used to update PMD component 3325.

Symbols to bits component 3345 may receive the symbols output from carrier recovery component 3340 and map the symbols back to bits. For example, symbol to bits component 3345 may map one symbol, in a constellation, to X bits, where X is an integer. In some implementations, the bits could be decoded for error correction using, for example, FEC. Output bits component 3350 may output j*X (j being an integer) bits at a time.

Mux component 3355 may combine the subcarriers together and undo the systematic interleaving introduced in de-mux component 3210 (see FIG. 13). FEC decoder 3360 may process the output of mux component 3355 to remove errors using forward error correction. Next, the output of FEC decoder 3360 may be supplied to inverse labelling circuitry 910, which supplies further outputs to DM decoder circuit 908, as described above. DM decoder 908, in turn, decodes the output of FEC decoder 3360 to supply the original bit sequence in a manner the same as or similar to that described above.

Figure 15:
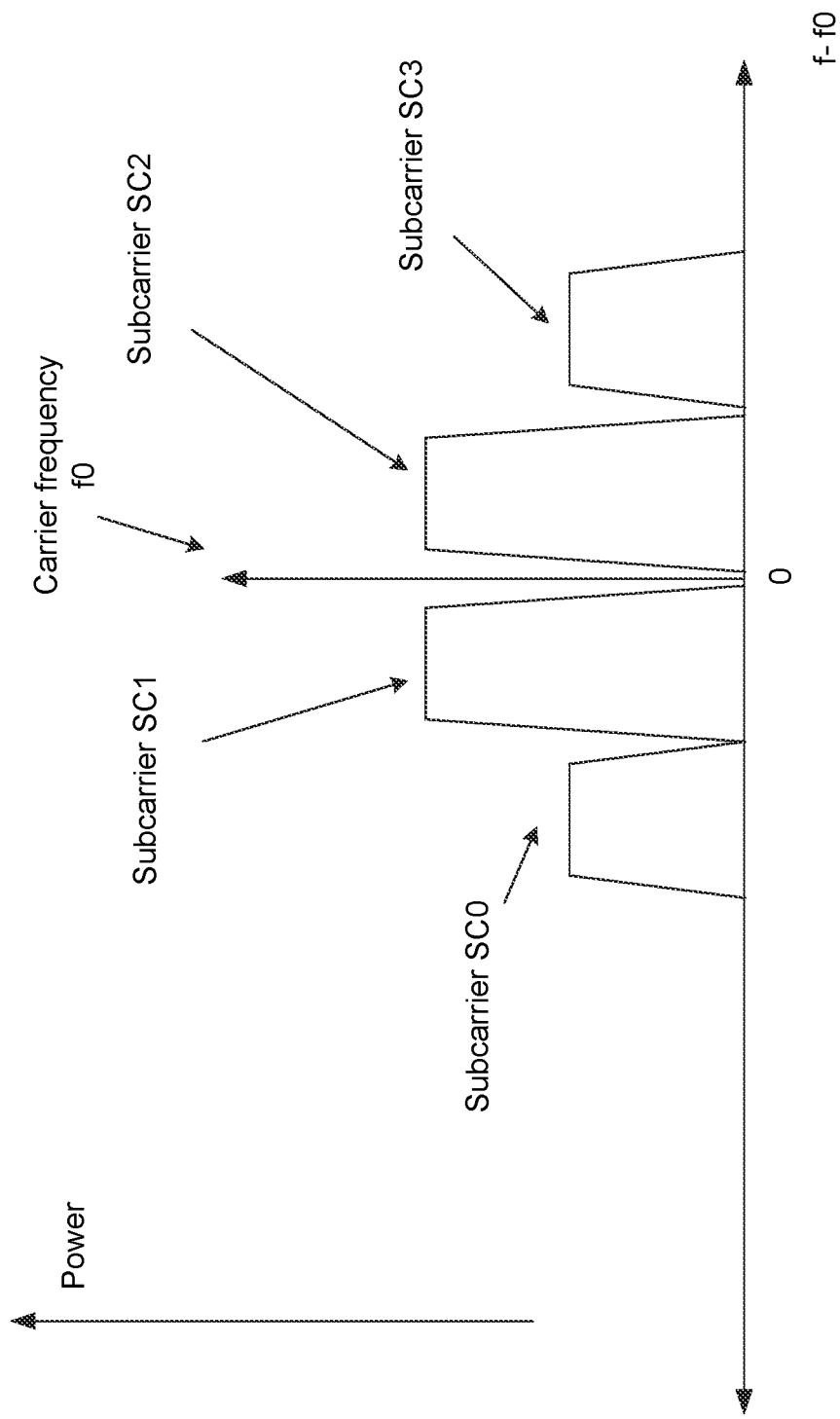
FIG. 15 illustrates an example a spectrum including representations of sub-carriers in the frequency domain consistent with an aspect of the present disclosure.

FIG. 15 illustrates an example of subcarriers SC0 to SC3 output from one of TX blocks 12 (see FIG. 1) including the circuitry shown in FIG. 13. As shown in FIG. 15, subcarriers SC0 to SC3 may not spectrally overlap with one another and may be, for example, Nyquist subcarriers, which may have a frequency spacing equal to or slightly larger than the individual subcarrier baud-rate.

As further shown in FIG. 15, subcarriers may also have spectra that are provided above (subcarriers SC2 and SC3) and below (subcarriers SC0 and SC1) a carrier frequency f0, which may correspond to a center frequency of the laser (e.g., laser 508). As further shown in FIG. 15, subcarriers SC0 and SC3 may, due to transmission impairments along optical communication path 16, be selectively attenuated, and, therefore, may have less power than subcarriers SC1 and SC2. Alternatively, subcarriers SC0 and SC3 may having a higher bit error rate (BER) than subcarriers SC1 and SC2. Consistent with an aspect of the present disclosure, subcarriers SC0 and SC3 may be modulated in accordance with a transmission probability distribution having an associated spectral efficiency (SE) that may be less than the SE (and corresponding transmission probability distribution) of subcarriers SC1 and SC2. In particular, symbols associated with inner points of the constellation associated with subcarriers SC0 and SC3 may be transmitted more frequently and with a higher first probability than symbols associated with outer points of the constellation that are transmitted with a lower second probability. Likewise, symbols associated with inner points of the constellation associated with subcarriers SC1 and SC2 may be transmitted more frequently and with a higher third probability than symbols associated with outer points of the constellation that are transmitted with a lower fourth probability. Further, in this example, the first probability associated with the inner symbols carried by SC0 and SC3 is greater than the third probability associated with the inner symbols carried by SC1 and SC2, such that SC0 and SC3 have a greater SNR (lower SE) to offset impairments noted above. SC1 and SC2 may, in this example, have fewer impairments than SC0 and SC3, and thus may be transmitted with a higher SE than that of SC0 and SC3, and a transmission probability distribution may be selected for SC0 and SC3 to realize such higher SE. Thus, in the example shown in FIG. 15, subcarriers may be transmitted with different transmission probability distributions tailored to a desired SE for each subcarrier so that the transmission rate or baud rate for each subcarrier may be optimized.

Figure 16:
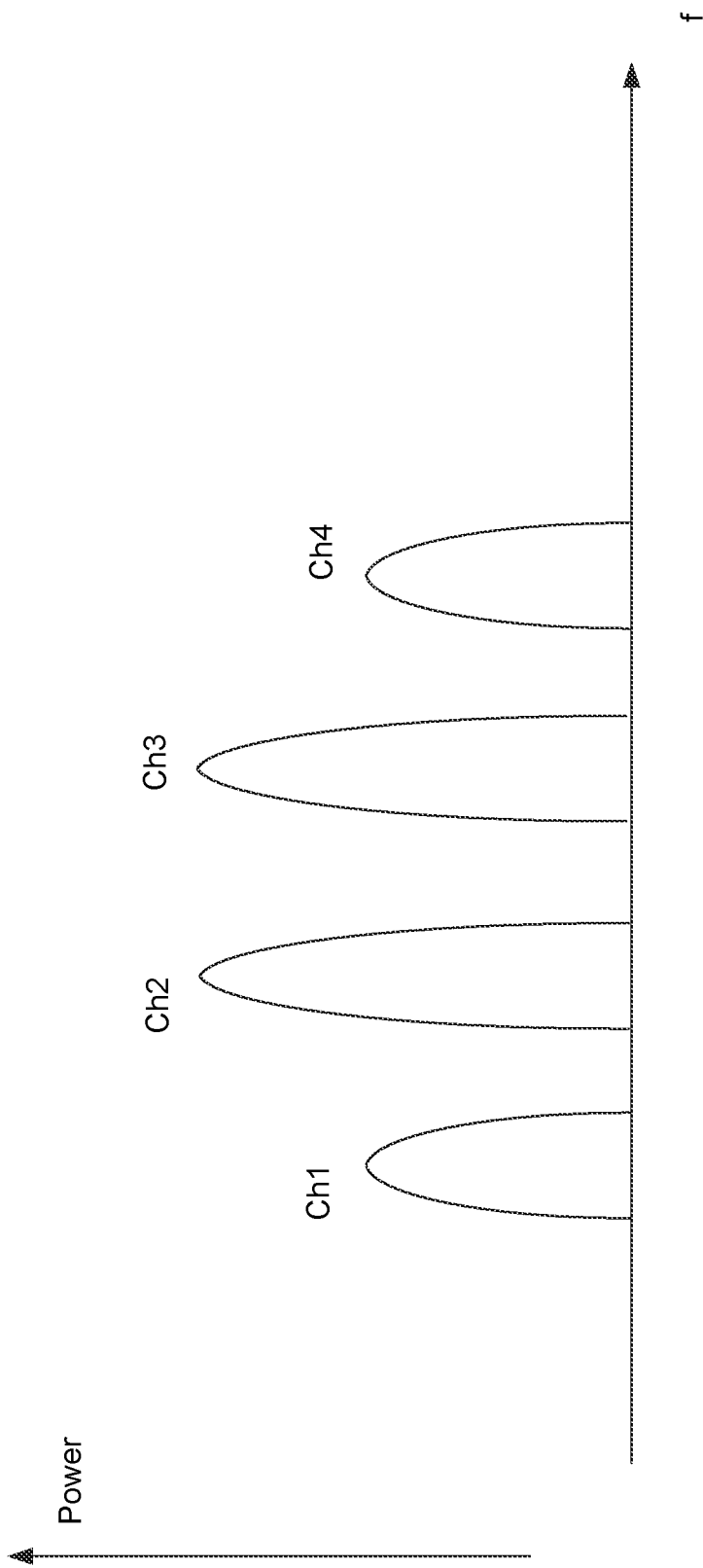
FIG. 16 illustrates an example of a spectrum including representations of channels in the frequency domain consistent with the present disclosure.

As shown in FIG. 16, similar optimization may be achieved in connection with individual channels, in which each channel is generated by light corresponding to a corresponding one of a plurality of lasers, each one having the same or similar construction as laser 508, as opposed to the subcarriers described above which are generated from light output from one laser.

In FIG. 16, channels Ch1 and Ch4 may, due to transmission impairments along optical communication path 16, be selectively attenuated, and, therefore, may have less power than channels Ch2 and Ch3. Alternatively, channels Ch1 and Ch4 may have a higher BER than channels Ch2 and Ch3. Consistent with a further aspect of the present disclosure, channels or optical signals Ch1 and Ch4 may be modulated in accordance with a transmission probability distribution having an associated spectral efficiency (SE) that may be less than the SE (and corresponding transmission probability distribution) of channels or optical signals Ch1 and Ch4. In particular, symbols associated with inner points of the constellation associated with channels ch1 and Ch4 may be transmitted more frequently and with a higher first probability than symbols associated with outer points of the constellation that are transmitted with a lower second probability. Likewise, symbols associated with inner points of the constellation associated with channels Ch2 and Ch3 may be transmitted more frequently and with a higher third probability than symbols associated with outer points of the constellation that are transmitted with a lower fourth probability. Further, in this example, the first probability associated with the inner symbols carried by Ch1 and Ch4 is greater than the third probability associated with the inner symbols carried by Ch2 and Ch3, such that channels Ch1 and Ch4 have a greater SNR (lower SE) to offset the impairments noted above. Channels Ch2 and Ch3 may, in this example, have fewer impairments than channels Ch1 and Ch4, and thus may be transmitted with a higher SE than that of Ch1 and Ch4, and a transmission probability distribution may be selected for Ch2 and Ch3 to realize such higher SE. Thus, in the example shown in FIG. 16, channels may be transmitted with different transmission probability distributions tailored to a desired SE for each channel so that the transmission rate or baud rate for each channel may be optimized.

Figure 17:
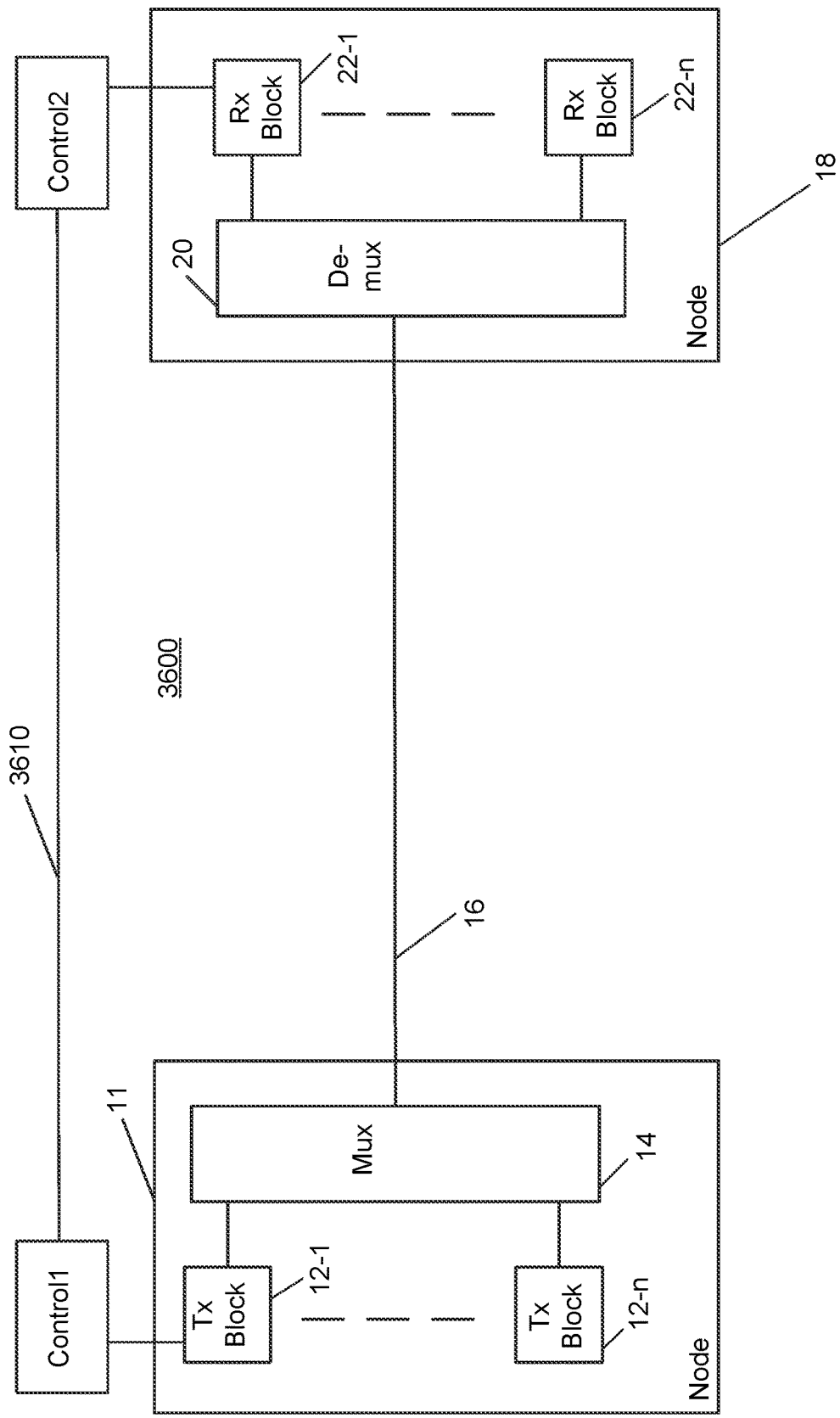
FIG. 17 illustrates a further example of an optical communication system consistent with the present disclosure.

An example of a communication system 3600 consistent with an additional aspect of the present disclosure will next be described with reference to FIG. 17. System 3600 is similar to system 100 described above in connection with FIG. 1 but further includes first and second control circuits Control1 and Control2. Control circuit Control2 may receive network monitoring parameters, such as bit error rate (BER), SNR, and or other information indicative of the performance or such parameters associated with one or more channels and/or subcarriers. Such information may be received from Rx Blocks 22 in node 18 shown in FIG. 17. In one example, such information may be conveyed to control circuit Control1 by an out-of-band signal, such as an optical service channel to node 11. Based on such information, control circuit Control1 may, in turn, provide control signals to one or more of Tx block 12. Based on such control signals, further signals may be provided to DM encoder 402, for example, to generate codewords associated with a desired transmission probability distribution, resulting in an optimized SE. Accordingly, for example, system 3600 may operate based on feedback provided by Rx blocks 22 and control circuit Control2 to optimize the transmission probability distribution of one or more of the channels and/or subcarriers output from one or more of Tx blocks 12 shown in FIG. 17.

In the above example, the codeword symbols may be binary in that each symbol may have one of two values, such as a '1' or a '0'.

Other embodiments will be apparent to those skilled in the art from consideration of the specification. For example, although probability distributions are disclosed above in which symbols associated with inner (lower amplitude) constellation points are transmitted with a higher probability than symbols associated with the outer constellation points, it is understood that codewords may be encoded and decoded in a manner similar to that described above to provide probability distributions in which symbols associated with the outer constellation points are transmitted more frequently and with higher probability than symbols associated with the inner constellation points. It is intended that the specification and examples be considered as exemplary only, with a true scope and spirit of the invention being indicated by the following claims.

What is claimed is:

1. An apparatus, comprising:
    an encoder circuit that receives an input data sequence, the input data sequence including k bits, where k is an integer, the encoder circuit outputting a codeword, based on the input data sequence,
    wherein the encoder circuit includes a plurality of memories, a first one of the plurality of memories having a first memory locations and a second one of the plurality of memories having a second memory locations, a number of the first memory locations being different than a number of the second memory locations, such that based on a respective one of a plurality of subsets of the k bits, each of the plurality of memories supplies a corresponding portion of the codeword;

a laser;

a modulator that receives light from the laser;

a drive circuit that supplies a drive signal, based on the codeword, to the modulator, the modulator supplying a modulated optical signal in accordance with a quadrature amplitude modulation (QAM) format, such that, based on the drive signal, the modulated optical signal carries modulation symbols in accordance with the codeword, the codeword being indicative of a distribution of the modulation symbols, wherein first ones of the modulation symbols having an associated first amplitude are transmitted more frequently than second ones of the modulation symbols having an associated second amplitude that is different than the first amplitude.

2. An apparatus in accordance with claim 1, further comprising a forward error correction circuit that receives the codeword and based on the codeword supplies an encoded output.

3. An apparatus in accordance with claim 2, wherein the encoded output includes parity bits.

4. An apparatus in accordance with claim 3, further including a mapper circuit that outputs in-phase and quadrature symbols based on the encoded output.

5. A system in accordance with claim 4, wherein the mapper circuit outputs in-phase and quadrature symbols based on the encoded output and the n codeword symbols.

6. An apparatus in accordance with claim 5, further including a demultiplexer, which receives the in-phase and quadrature symbols at an input and supplies the in-phase symbols at a first output and the quadrature symbols at a second output.

7. An apparatus in accordance with claim 1, wherein the encoder circuit is one of a plurality of encoder circuits and the codeword is one of a plurality of codewords, each of the plurality of encoder circuits outputting a corresponding one of the plurality of codewords, each of the plurality of codewords having n codeword symbols.

8. An apparatus in accordance with claim 1, wherein each of the plurality of memories includes a look-up table.

9. An apparatus in accordance with claim 1, wherein each of the plurality of memories stores spherical constellation shaped data associated with the distribution of modulation symbols.

10. An apparatus in accordance with claim 1, wherein each of said one of a plurality of subsets of the k bits constitutes a respective one of a plurality of addresses, each of which corresponding to one of the first memory locations or a corresponding one of the second memory locations.

11. An apparatus, comprising:
an encoder circuit including:
an input that receives an input data sequence, the input data sequence including k bits, where k is an integer, wherein the encoder circuit includes a plurality of memories, a first one of the plurality of memories having a first memory locations and a second one of the plurality of memories having a second memory locations, a number of the first memory locations being different than a number of the second memory locations, such that based on a respective one of a plurality of subsets of the k bits, each of the plurality of memories supplies a corresponding portion of a codeword; and an output that supplies the codeword, which is indicative of a distribution of a modulation symbols carried by an optical signal modulated in accordance with an m-quadrature amplitude modulation (QAM) format, m being an integer greater than or equal to 16, wherein first ones of the modulation symbols having an associated first amplitude are transmitted more frequently than second ones of the modulation symbols having an associated second amplitude that is different than the first amplitude.

12. An apparatus in accordance with claim 11, further comprising:
a laser;
a modulator that receives light from the laser;
a drive circuit that supplies a drive signal, based on the codeword, to the modulator, the modulator supplying the modulated optical signal based on the drive signal.

13. An apparatus in accordance with claim 11, wherein m is greater than or equal to 64.

14. An apparatus in accordance with claim 13, further comprising a forward error correction circuit that receives the codeword and provides an encoded output.

15. An apparatus in accordance with claim 14, wherein the encoded output include parity bits.

16. An apparatus in accordance with claim 15, further including a mapper circuit that outputs in-phase and quadrature symbols based on the encoded symbols.

17. A system in accordance with claim 16, wherein the mapper circuit outputs in-phase and quadrature symbols based on the encoded output and the codeword, the drive signal being further based on the in-phase and quadrature symbols.

18. An apparatus in accordance with claim 17, further including a demultiplexer, which receives the in-phase and quadrature symbols at an input and supplies the in-phase symbols at a first output and the quadrature symbols at a second output.

19. An apparatus in accordance with claim 11, wherein the encoder circuit is one of a plurality of encoder circuits and the codeword is one of a plurality of codewords, each of the plurality of encoder circuits outputting a corresponding one of the plurality of codewords.

20. An apparatus in accordance with claim 1, wherein the first amplitude is less than the second amplitude.

* * * * *